(12) United States Patent
Stern et al.

(10) Patent No.: US 6,370,339 B1
(45) Date of Patent: Apr. 9, 2002

(54) SYSTEM AND METHOD FOR OPERATING AN ELECTRONIC FILM CAMERA

(75) Inventors: Jonathan M. Stern, Newport Beach; Robert L. Mifflin, Fallbrook, both of CA (US); Randolph S. Carlson, Carson City, NV (US)

(73) Assignee: Silicon Film Technologies, Inc., Irvine, CA (US)

( * ) Notice: Subject to any disclaimer, the term of this patent is extended or adjusted under 35 U.S.C. 154(b) by 0 days.

(21) Appl. No.: 09/439,893

(22) Filed: Nov. 12, 1999

Related U.S. Application Data
(60) Provisional application No. 60/108,348, filed on Nov. 13, 1998, and provisional application No. 60/144,310, filed on Jul. 16, 1999.

(51) Int. Cl.[7] ............................................. G03B 17/48
(52) U.S. Cl. ........................ 396/429; 348/64; 348/373; 348/376
(58) Field of Search .......................... 396/429; 348/64, 348/220, 373, 376, 231, 233, 374, 375, 266, 272, 273, 275, 280

(56) References Cited

U.S. PATENT DOCUMENTS

| | | |
|---|---|---|
| 5,282,040 A | 1/1994 | Sapir |
| 6,181,883 B1 * | 1/2001 | Oswal ........................ 396/429 |

FOREIGN PATENT DOCUMENTS

| | | |
|---|---|---|
| EP | 0 583 391 B1 | 10/1997 |
| WO | WO 92/20007 | 11/1992 |
| WO | WO 99/12345 | 3/1999 |

\* cited by examiner

*Primary Examiner*—David M. Gray
(74) *Attorney, Agent, or Firm*—Knobbe, Martens, Olson & Bear, LLP

(57) ABSTRACT

An electronic film (E-film) apparatus that reversibly converts a conventional film camera body into an E-film camera is described. The electronic film apparatus includes one or more state sensors that sense the operating state of the camera body. State sensors include an electromagnetic sensor, an acoustic sensor, and/or an optical sensor. The data gathered by the sensors is used to determine the operating state of the camera. Based on the operating state of the camera, the E-film apparatus operates in various power modes, including sleep modes, low power modes, and full power modes. The electromagnetic sensor includes a loop or coil that converts electromagnetic fields into an electrical signal. The acoustic sensor senses vibrations in the camera due to operation of the mechanical aspects of the camera body. The acoustic sensor converts vibrations in the camera body into an electrical signal. If the envelope of the electrical signals from the sensors exceeds a threshold, the E-film apparatus awakens from a lower power mode. Signal processing is then used to compare a measured waveform or spectrum to an expected waveform or spectrum. The E-film apparatus can also sense opening of the camera shutter by illuminating the shutter with a low duty cycle infrared light source and measuring the light reflected by the shutter.

152 Claims, 20 Drawing Sheets

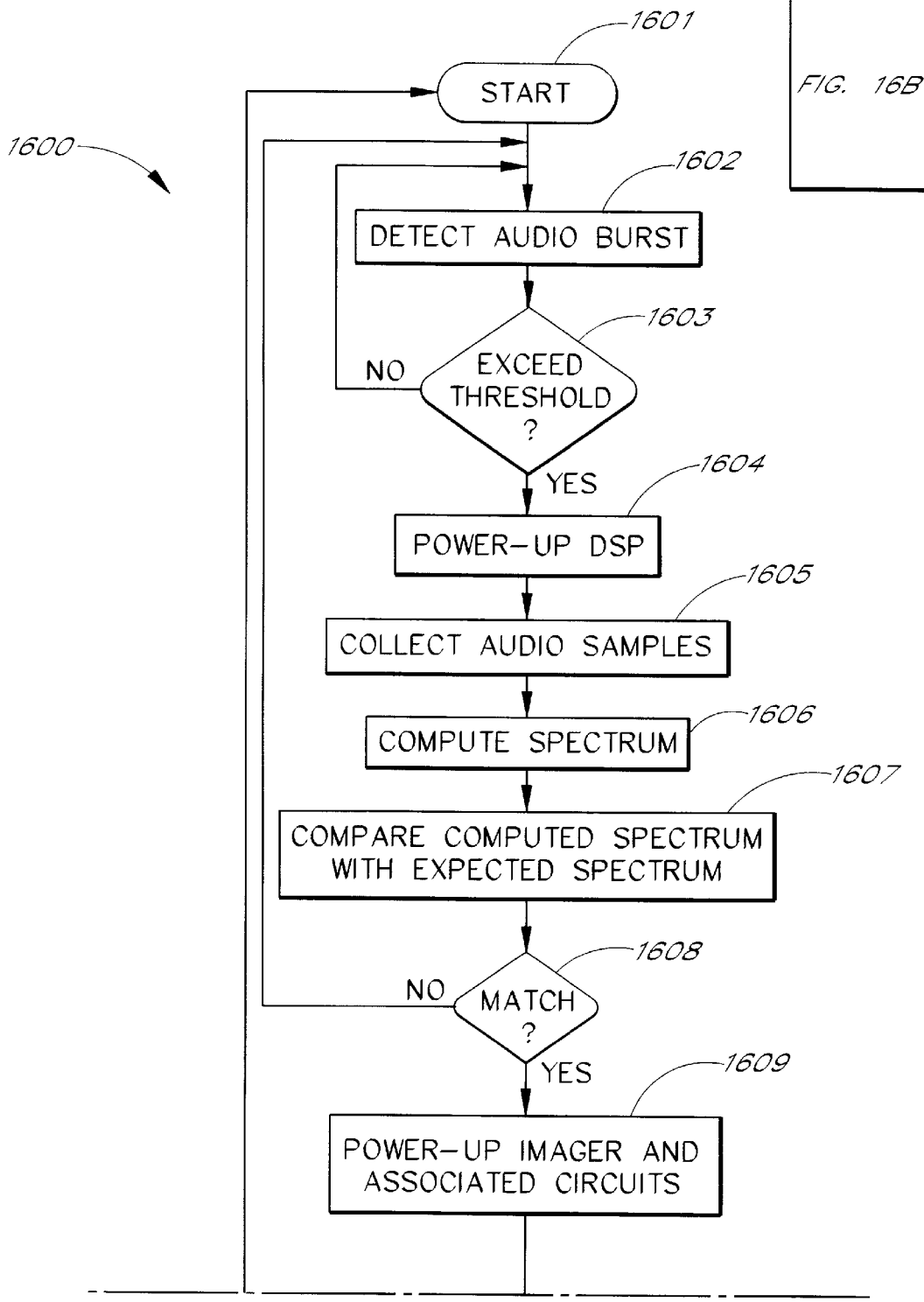

SYSTEM AND METHOD FOR OPERATING AN ELECTRONIC FILM CAMERA

REFERENCE TO RELATED APPLICATIONS

The present invention claims priority benefit of U.S. Provisional Application No. 60/108,348, filed Nov. 13, 1998, titled "ELECTRONIC PHOTO ALBUM AND METHOD OF FILM PROCESSING." The present application also claims priority benefit of U.S. Provisional Application No. 60/144,310, filed Jul. 16, 1999, titled "NON-OPTICAL TRIGGERING METHOD FOR ELECTRONIC FILM CARTRIDGES."

BACKGROUND OF THE INVENTION

1. Field of the Invention

The present invention relates to photographic cameras, and more particularly to electronic cameras for creating digital images using an electronic image sensor.

2. Description of the Related Art

In conventional photographic film cameras, image recording typically is performed by sequentially projecting optical images onto photographic film. Photons strike light-sensitive chemical grains in the photographic film to form latent images. The latent images are later developed by chemical processing to be viewed directly (as slides) or print on photographic paper.

While conventional photographic camera and film systems produce high-resolution images, such systems do have certain limitations. For example, image storage and retrieval are inconvenient, time-consuming, and it is difficult to copy, to modify, and to transmit the photographic images. Moreover, if the images are to be used with computers or computer networks such as the Internet or Worldwide Web, the images must be scanned or otherwise converted into digital data.

To overcome these and other limitations of conventional film cameras, electronic cameras use an electronic image sensor to capture an optical image and convert the optical image into an electrical image signal. Processing circuits in the electronic camera then convert the electrical image signal into digital data (digital images) suitable for use by a computer or computer network. The digital images can be, stored, transmitted over a network, displayed on a computer display, printed on a computer printer, etc. The digital images can also be easily edited or modified in format, resolution, and color mapping. Special optical effects can also be added.

Unfortunately, many photographers have a significant investment in conventional photographic equipment, that is, photographic equipment designed for photographic film. This investment includes cameras, camera bodies, camera lenses, viewers, viewfinders, flash equipment, and the like. A photographer wishing to switch from conventional film to digital photography (e.g., electronic film (E-film)) is faced with the daunting and expensive task to purchasing new equipment. Moreover, conventional film and E-film tend to be complementary in some respects such that conventional film is better suited to some photographic tasks and E-film is better suited to other photographic tasks. Thus, some photographers choose to use both conventional film and E-film.

SUMMARY OF THE INVENTION

The present invention solves these and other problems by providing an electronic film (E-film) apparatus that reversibly converts a conventional film camera body into an E-film camera. The electronic film apparatus includes one or more state sensors that sense the operating state of the camera body without requiring modification or cooperation by the camera body. In one embodiment, the state sensors sense that the camera shutter is about to open, before the shutter actually opens, thereby allowing the imager and associated circuitry to be powered up and initialized prior to the operation of the shutter.

In one embodiment, the state sensors include an electromagnetic sensor. In one embodiment, the state sensors include an acoustic sensor. In one embodiment, the state sensors include an optical sensor. The data gathered by the sensors is used to determine the operating state of the camera. Based on the operating state of the camera, the E-film apparatus operates in various power modes, include very low power modes (e.g. sleep modes), low power modes (e.g. standby modes, digital audio modes), and full power modes (e.g. image acquisition modes). In one embodiment, the E-film apparatus uses data from the state sensors to determine when to initiate image acquisition. In one embodiment, the E-film apparatus uses data from the state sensors to determine when to terminate image acquisition.

In one embodiment, the E-film apparatus includes an E-film cartridge that reversibly converts a conventional 35 mm film camera into an E-film camera. The 35 mm camera can be a single lens reflex (SLR) camera, a point-and-shoot camera, a rangefinder camera, and the like. In one embodiment, the E-film apparatus includes a replaceable camera back that converts a conventional camera, such as a 35 mm camera, medium format cameras, ideal format cameras, large format camera, and the like, into an E-film camera.

In one embodiment, the electromagnetic sensor includes a loop or coil that converts electromagnetic fields into an electrical signal. In one embodiment, the envelope of the electrical signal is detected by an envelope detector. The amplitude of a portion of the envelope is compared to a threshold and, if the envelope exceeds the threshold, the E-film apparatus enters image acquisition mode.

In one embodiment, the acoustic sensor includes a microphone or other vibration sensor that senses vibrations in the camera due to operation of the mechanical aspects of the camera body such as motion of a shutter button, motion of a mirror (as in a SLR camera) and/or motion of a mechanical shutter. The microphone converts vibrations in the camera body into an electrical signal. In one embodiment, the envelope of the electrical signal from the microphone is detected by an envelope detector. The amplitude of a portion of the detected acoustic envelope is compared to a threshold and, if the envelope exceeds the threshold, the E-film apparatus enters an image acquisition mode.

Alternatively, if the amplitude of a portion of the detected acoustic envelope exceeds the threshold, the E-film apparatus enters an acoustic sampling (i.e. digital audio) mode. In the acoustic sampling mode, power is applied to a signal processor (such as a digital signal processor), and the electrical signals from the microphone are provided to an analog-to-digital converter and converted into a string of digital samples. The digital samples are provided to the signal processor. The signal processor computes a frequency spectrum of the digital samples and compares the computed frequency spectrum to an expected frequency spectrum. If the computed frequency spectrum is sufficiently similar to the expected frequency spectrum, then the E-film apparatus provides power to the image sensor and begins image acquisition. In one embodiment, the computed frequency spectrum and the expected frequency spectrum are compared by computing a cross-correlation between the two spectrums.

In one embodiment, the E-film apparatus senses opening of the camera shutter by illuminating the shutter with a light source and measuring the light reflected by the shutter. In one embodiment, the light source is an infrared source. In one embodiment, the infrared source provides short pulses of light and operates at a relatively low duty cycle. In one embodiment, the infrared source is operated only when other sensors, such as the electromagnetic or acoustic sensors have provided data indicating that operation of the shutter appears to be eminent.

DETAILED DESCRIPTION

Figure 1:
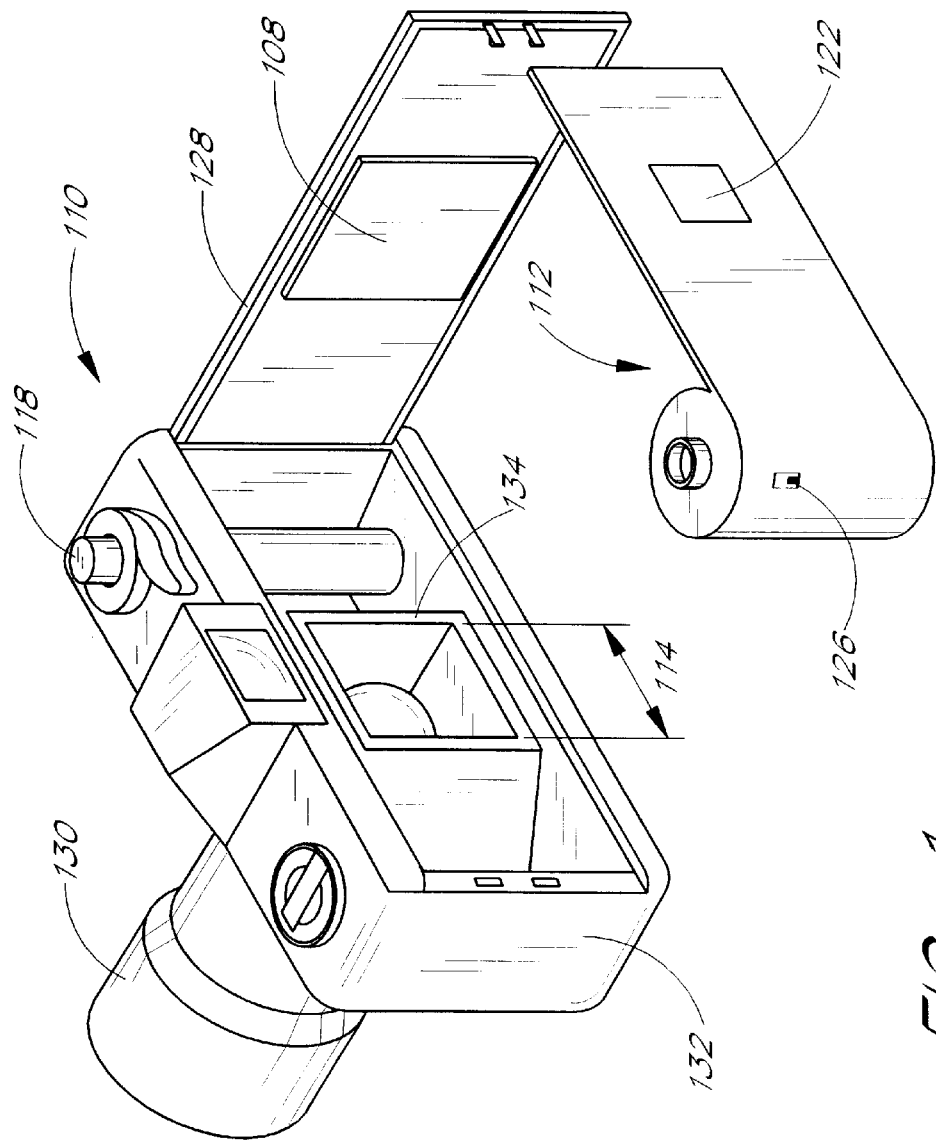
FIG. 1 shows a conventional single lens reflex camera and an electronic film cartridge.

FIG. 1 shows a standard 35 mm single lens reflex camera 110 having a camera body 132, a camera lens 130, and a camera back 128. A shutter button 118 is disposed on an upper surface of the camera body 132. FIG. 1 shows a rear view of the camera 110 with the back 128 open. Inside the camera 110, an image (focal) plane area 114 corresponds to a region where the lens 130 produces a focused image. A pressure plate 108 is disposed on an inner surface of the camera back 128. The pressure plate 108 is provided to press a photographic film against the image plane to improve sharpness of the image produced on the film.

FIG. 1 also shows on electronic film cartridge (E-film cartridge) 112. The E-film 112 includes an optional on/off switch 120 and an optional pressure sensor 122. The optional switch 120 is provided to allow a user to turn the E-film cartridge on and off. The optional pressure sensor 122 is provided to allow the E-film cartridge 112 to sense that the E-film cartridge 112 has been placed inside the camera body 132 and that the back 128 has been closed. As described in more detail in connection with FIG. 7, the E-film cartridge 112 operates in different power modes (e.g., off, sleep mode, low-power mode, etc.) depending on whether the E-film cartridge is in the camera (with the back closed) or outside the camera.

Figure 2:
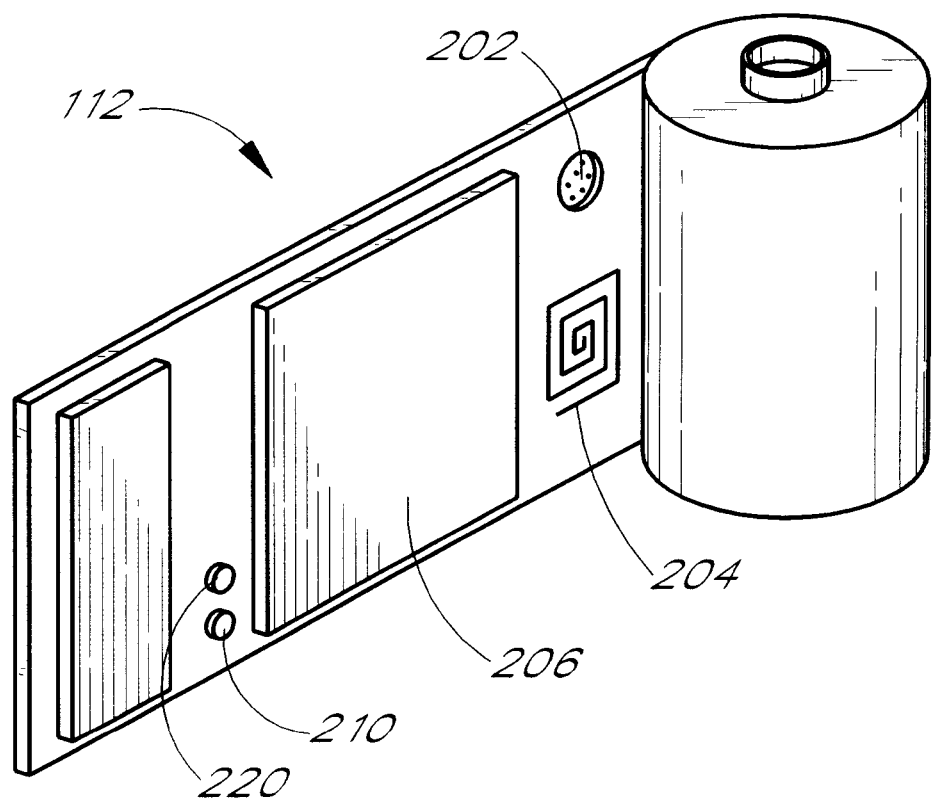
FIG. 2 shows an electronic film cartridge having an electromagnetic sensor, an acoustic sensor, an optical source, and an optical sensor.

FIG. 2 shows additional details of the E-film cartridge 112. The front surface of a flag portion of the E-film cartridge 112 includes an image sensor 206, an optional electromagnetic sensor 204, an optional acoustic sensor 202, an optional optical sensor 210, and an optional optical source 220.

When placed inside the camera 110, the E-film cartridge 112 turns the conventional camera 110 into an electronic camera allowing electronic digital pictures to be acquired and stored in the electronic film cartridge 112. The digital pictures stored in the electronic film cartridge 112 can be later downloaded into computer for display, printing, editing, etc.

Figure 3:
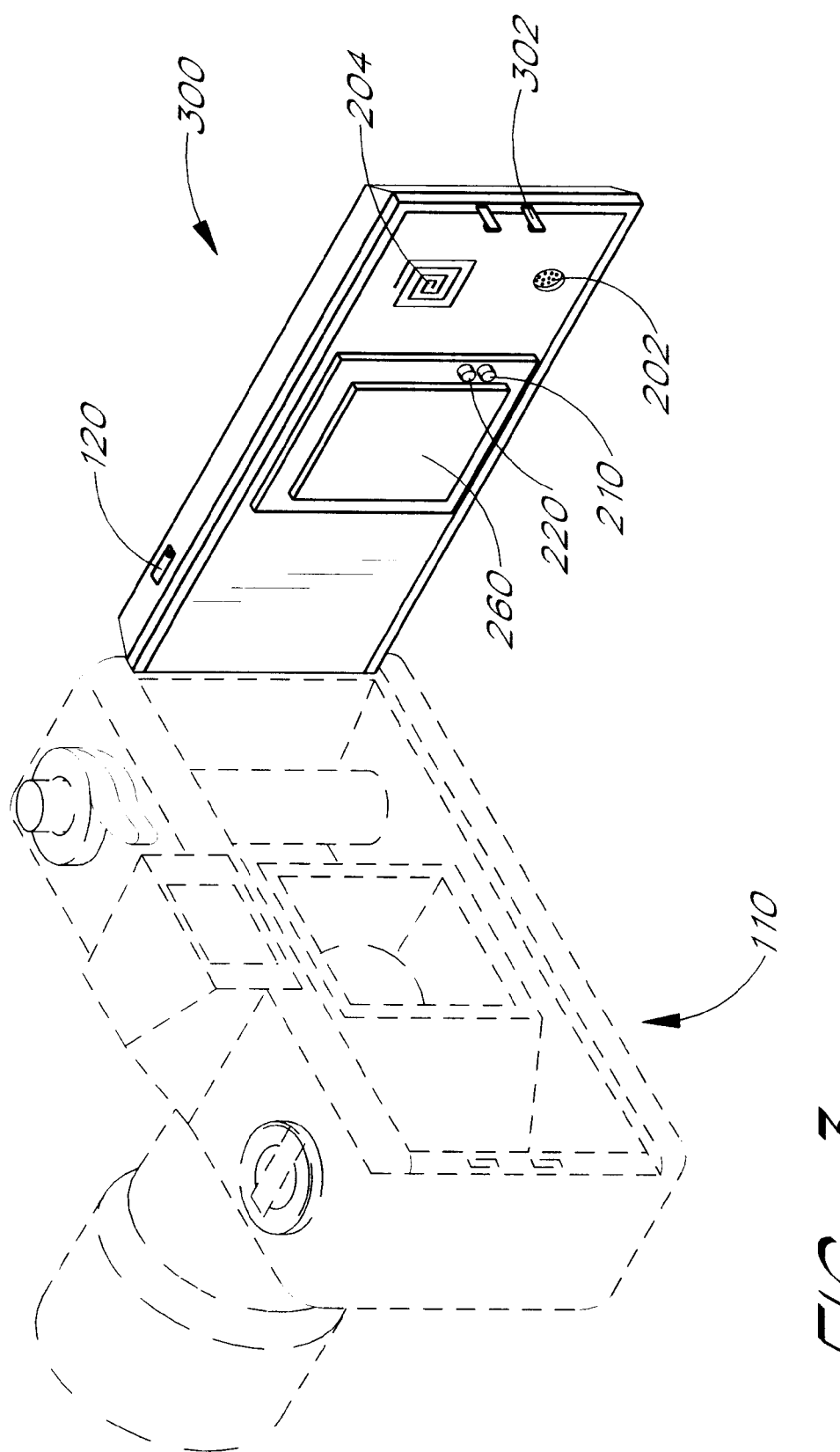
FIG. 3 shows a conventional single lens reflex camera with an electronic film back that includes an electromagnetic sensor, an acoustic sensor, an optical source, and an optical sensor.

In an alternative embodiment, the camera 110 can be turned into an electronic camera by using an electronic film back 300 shown in FIG. 3. The electronic film back 300 includes the optional on/off switch 120, the image sensor 260, the optional acoustic sensor 202, the optional electromagnetic sensor 204, the optional optical sensor 210, and the optinal source 220. A latch mechanism 302 is provided on the electronic film back 300 to hold the film back 300 closed against the camera body 132. The latch 302 can be used to perform a function similar to that of the pressure sensor 122 on the E-film cartridge 112 insomuch as the latch can be used to sense that the back 300 is mounted on the camera body 132 and the back 300 is closed.

Figure 4:
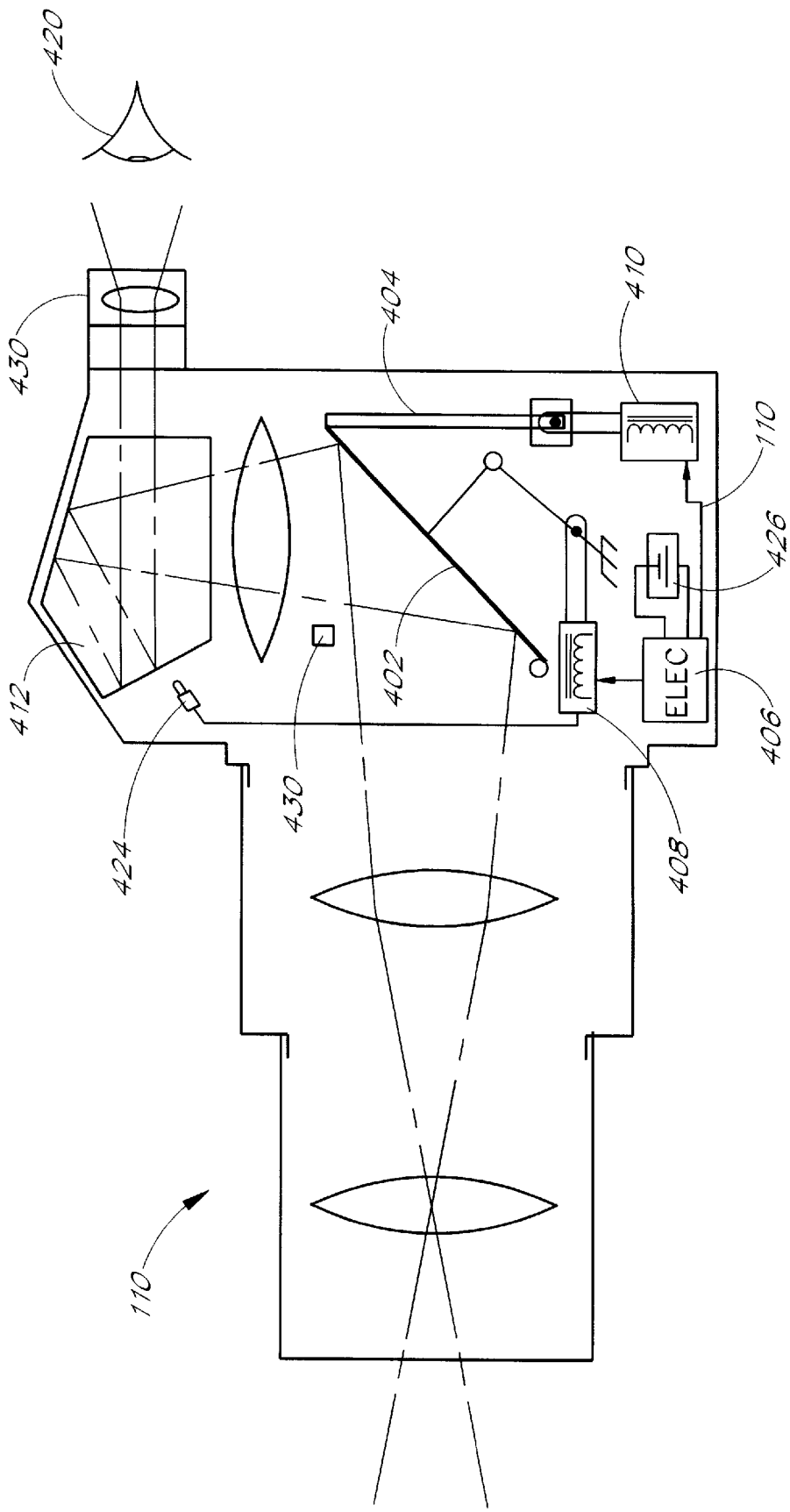
FIG. 4 shows major mechanical operational elements of a single lens reflex camera including a mirror, a mirror actuator, a shutter, and a shutter actuator.

FIG. 4 is a schematic diagram showing major mechanical elements of the camera 110, including a mirror 402 and a shutter 404. When the camera 110 is not in a picture-taking mode, light entering the camera 110 is focused by one or more lenses and reflected by the mirror 402 up to a pentaprism 412. The pentaprism 412 redirect the light from the mirror out through an eyepiece 430 to a user 420.

FIG. 4 also shows various electronic and electromechanical aspects of the camera 110 including a power source 426 (such as a battery) that provides energy to power the circuits of an electronic control system (processor) 406. Outputs from a metering sensor 424 are provided to a metering input of the electronic control system 406. A mirror control output from electronic control system 406 is provided to a mirror actuator 408. A mechanical linkage links the mirror actuator 408 to the mirror 402 allowing the actuator 408 to cause the mirror to move up and down. In a normal, idle state, the mirror 402 is in a "down" position allowing light to be reflected into the pentaprism 412. During a picture taking process, the mirror actuator 408 causes the mirror 402 to swing up, thereby allowing light from the lens to fall on the shutter 404. When the shutter 404 is opened, the light falls on photographic film or an electronic image sensor 206 disposed behind the shutter 404. A shutter control output from the electronic control module 406 is provided to a shutter actuator 410 to open and close the shutter 404.

Figure 5:
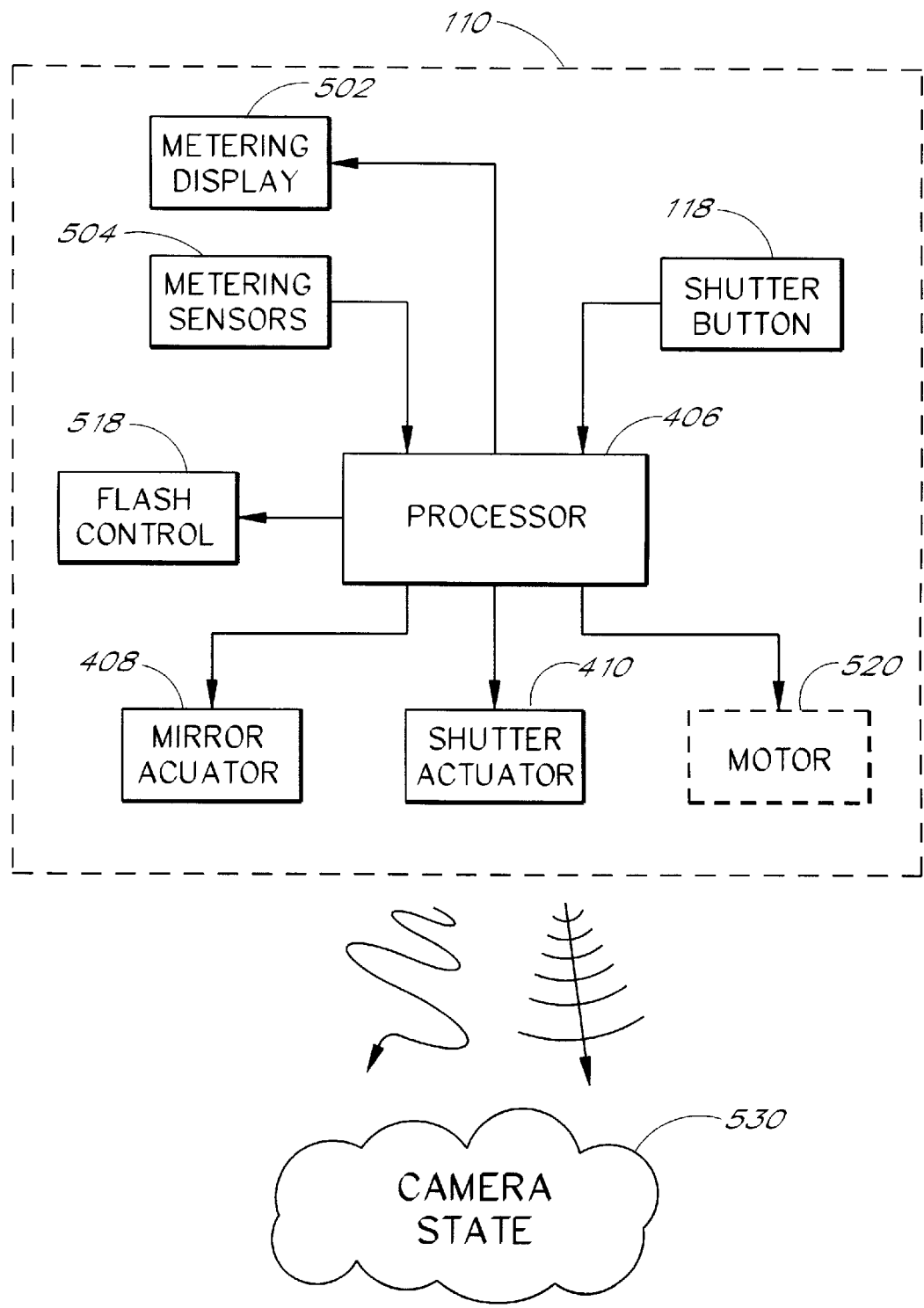
FIG. 5 is a block diagram of the functional elements of a single lens reflex camera wherein the electromagnetic and acoustic emissions from the functional elements are indicative of a camera state.

FIG. 5 is a block diagram showing the functional blocks of the camera 110. A flash control output from the processor 406 is provided to a flash control module 518. The flash control module 518 can be a control circuit that controls the operation of an external flash. Alternatively, the flash control module 518 can include an internal flash built into the camera 110. The mirror control output from the processor 406 is provided to the mirror actuator 408. The shutter control output from the processor 406 is provided to the shutter actuator 410. A motor control output from the processor 406 is provided to a motor 520. The motor 520 is optional and provides automatic wind and rewind operations. An output from shutter button 118 is provided to the processor 406. An output from the metering sensors 504 is provided to the processor 406. A metering output from the processor 406 is provided to a metering display 502.

Operation of the various elements of the camera can be described in terms of a camera state 530. The camera state 530 can be sensed by sensing emissions from the various fictional blocks in the camera 110. Suitable sensors include acoustic sensors (such as the sensor 202) to sense acoustic emissions, electromagnetic sensors (such as the sensor 204) to sense electromagnetic emissions, and the like. Optical sensors such as the sensor 210 can also be used in connection with sources such as the optical source 220 to sense the position of various elements of the camera 110.

As stated, the operation of the various emissions from the camera 110 can be sensed to deduce the camera state 530. For example, the mirror actuator 408 is typically an electromechanical device such as a motor or solenoid that produces electromagnetic emissions having an electromagnetic signature or "fingerprint" and acoustic emissions having an acoustic signature or "fingerprint." The shutter actuator 410 is also typically an electro-mechanical device that produces an electromagnetic signature and an acoustic signature. The processor 406 typically produces an electromagnetic signature. These electromagnetic and acoustic emissions can be sensed to deduce a general camera state 530 corresponding to the operating state of the camera 110.

Figure 6:
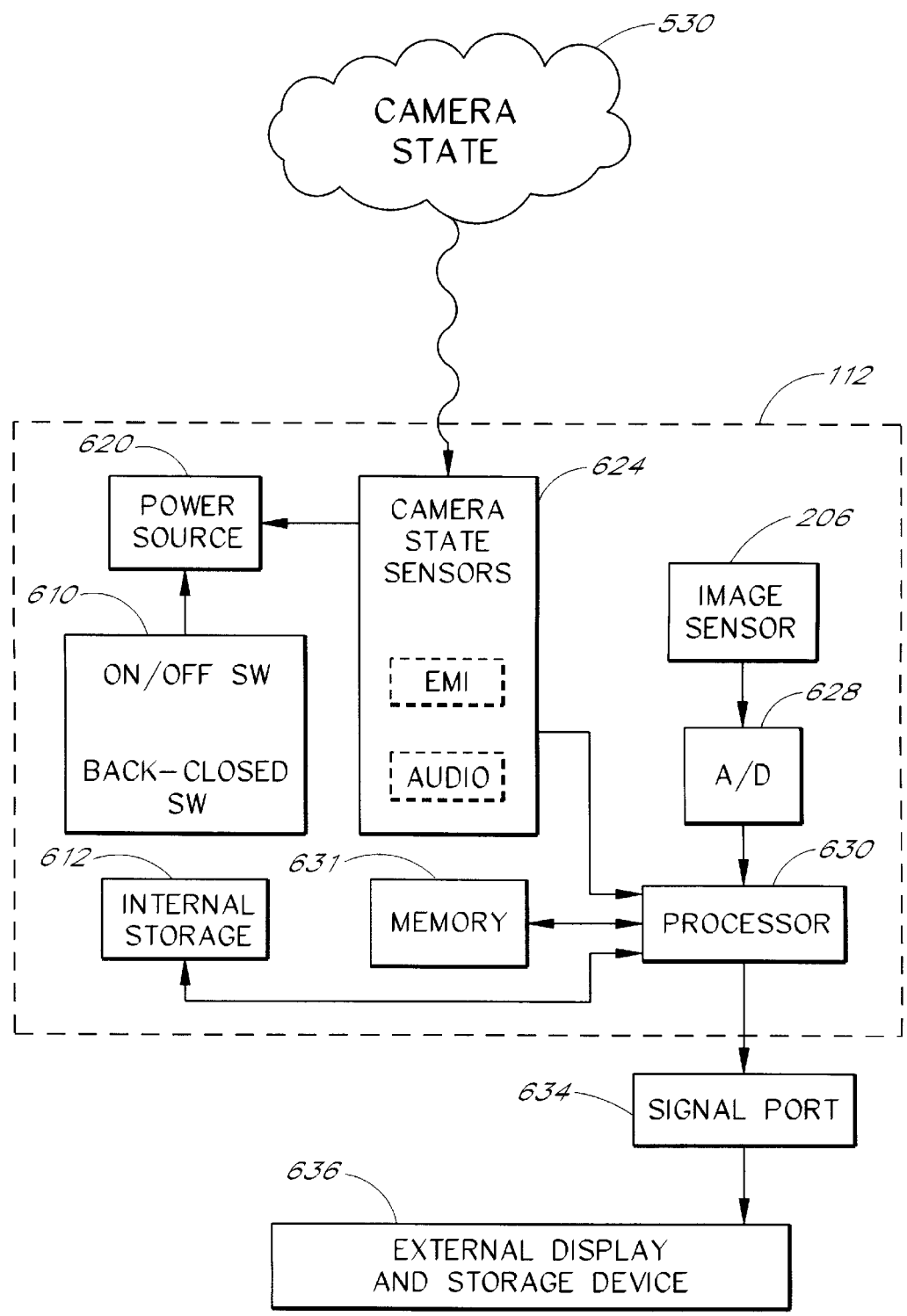
FIG. 6 is a block diagram showing functional elements of an electronic film apparatus, such as an E-film cartridge, that senses the camera state shown in FIG. 5.

FIG. 6 is a block diagram of the functional elements of an electronic image capture device such as the E-film cartridge 112 or the electronic film back 300. In the discussion that follows, the E-film cartridge 112 is used as an example of electronic image capture device with the understanding that the electronic camera back 300 or other electronic image capture devices can be used as well.

The E-film cartridge 112 includes a power source 620, an optional power switch 610, and camera state sensors 624. The power switch 610 can include for example the on/off switch 120 and/or the pressure sensor 122. Outputs from the switch 610 are provided to a power source 620 to control operation and power modes of the E-film cartridge 112. A first power control output from the camera state sensor 624 is provided to the power source 620 and a second power control output from the camera state sensor 624 is provided to a processor 630. The camera state sensor 624 includes sensors and sensor systems such as an electromagnetic sensor system 685 and an audio sensor system 680. The E-film cartridge 112 also includes the image sensor 206. An output from the image sensor 206 is provided to an analog-to-digital converter 628. A digital output from the analog-to-digital converter 628 is provided to the processor 630. The processor 630 communicates with an internal memory 631 and internal storage 612 to process and store images captured from the image sensor 206. The processor 630 also communicates with an interface port 634. The interface port 634 communicates with external storage and display devices 636 to allow the user to display captured images, store captured images, download captured images, and in general manipulate images captured by the E-film cartridge 112.

Figure 7:
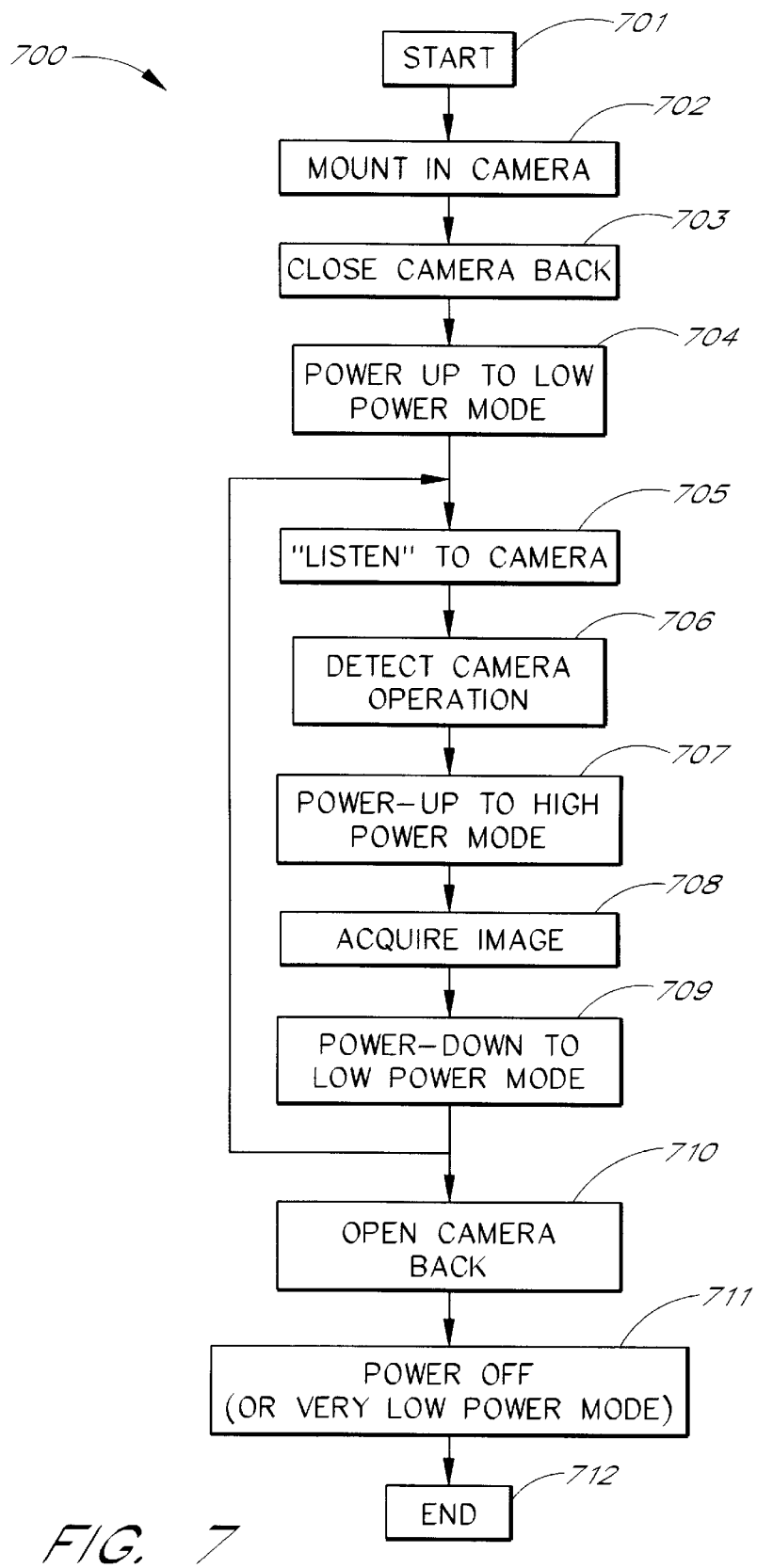
FIG. 7 is a flowchart showing the operation of an E-film cartridge including transitions from lower-power modes to higher-powered modes.

FIG. 7 is a flowchart 700, beginning with a start block 701, that shows overall operation of the E-film cartridge 112. The flowchart 700 advances from the start block 701 to a process block 702 when the E-film cartridge 112 is mounted in the camera 110. After the E-film cartridge 112 is mounted in the camera 110, the process advances to a process block 703 when the camera back 128 is closed. Once the camera back 128 is closed the process advances to process block 704 where the E-film cartridge 112 powers up into a low-power mode. E-film cartridge 112 is typically powered into the low-power mode based on an input from the pressure sensor/switch 122. Once in the low-power mode, the process advances to a process block 705 wherein the E-film cartridge 112 "listens" to the electromagnetic and/or acoustic emissions from the camera 110. In the process block 705 the E-film cartridge can listen to electromagnetic emissions produced by the camera 110, acoustic emissions produced by the camera 110, or other indicators of the camera state 503. When the E-film cartridge "hears" an emission from the camera 110, the process advances to a process block 706 were the processor 630 uses the measured emission data to determine the camera state 530.

When it is determined that the camera 110 has entered a desired operational state, such as a state where the shutter 404 is about to be operated, the process advances to a process block 707 where the power source 624 powers-up circuits in the E-film cartridge 112 needed to acquire and process an image. Upon power-up, the process advances to process block 708 where an image is acquired. After the image is acquired, the process advances to the process block 709 where the power source powers down the image processing circuits and the E-film cartridge 112 again enters a low-power mode. Upon entering the low-power mode, the process returns to the process block 705 and listens to the camera. This process comprising process blocks 705–709 continues until the camera back 128 is opened, whereupon the process advances to a process block 710. Once the camera back 128 is opened, the process advances to a process block 711 were the E-film cartridge enters a power off or very low-power mode (e.g., a sleep mode).

Figure 8:
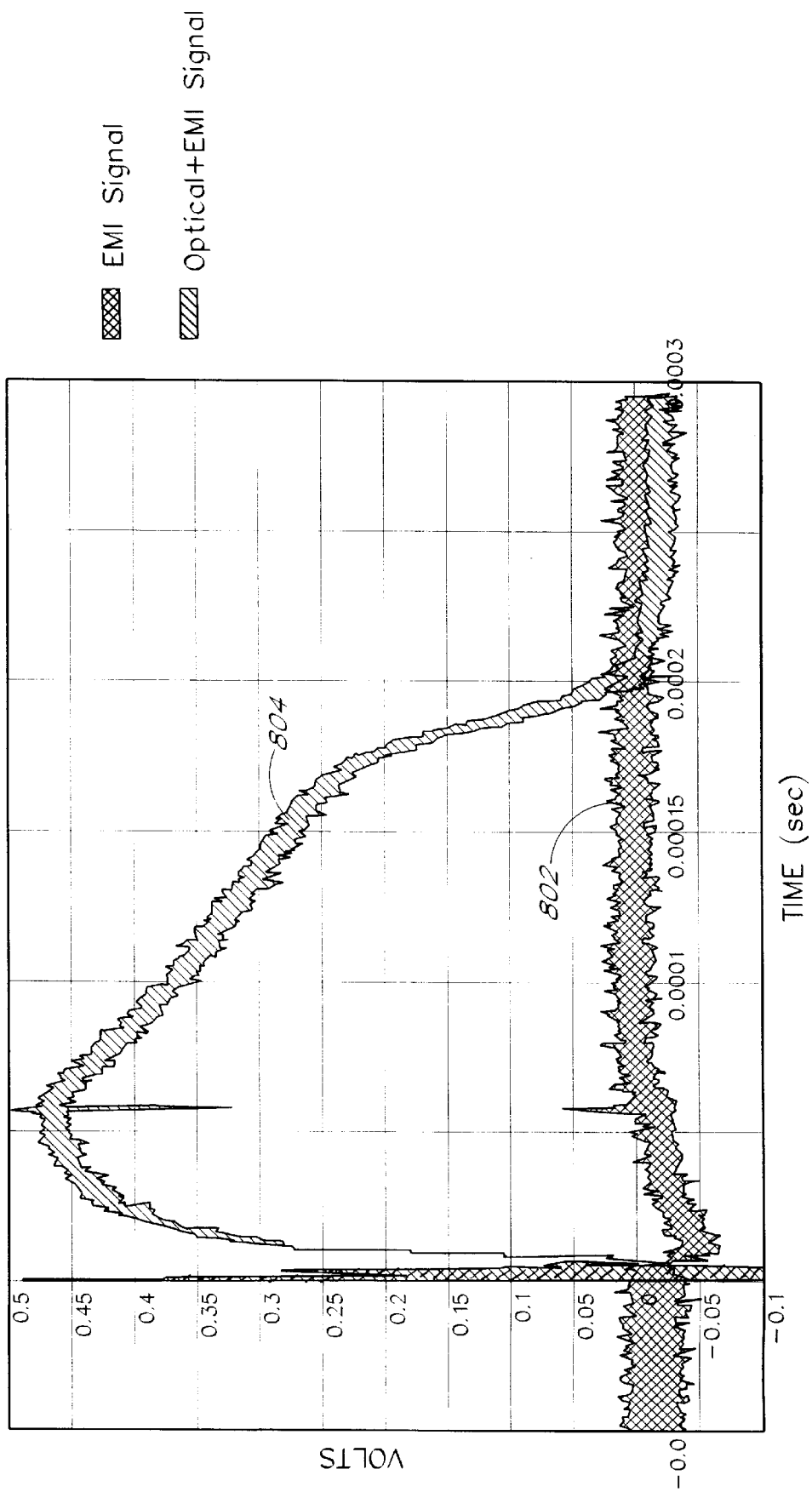
FIG. 8 is a plot showing electromagnetic emissions of a typical SLR camera during a picture-taking operation sequence.

FIG. 8 is a plot having a curve 802 that shows electromagnetic emissions produced by a typical 35 mm single lens reflex (SLR) camera. FIG. 8 also shows a curve 804 that shows the optical signal produced by placing an optical sensor behind the shutter 404 (thus showing when the shutter is open and closed). The curve 804 shows a leading edge when the shutter 404 opens and a falling edge when the shutter 404 closes.

Figure 9:
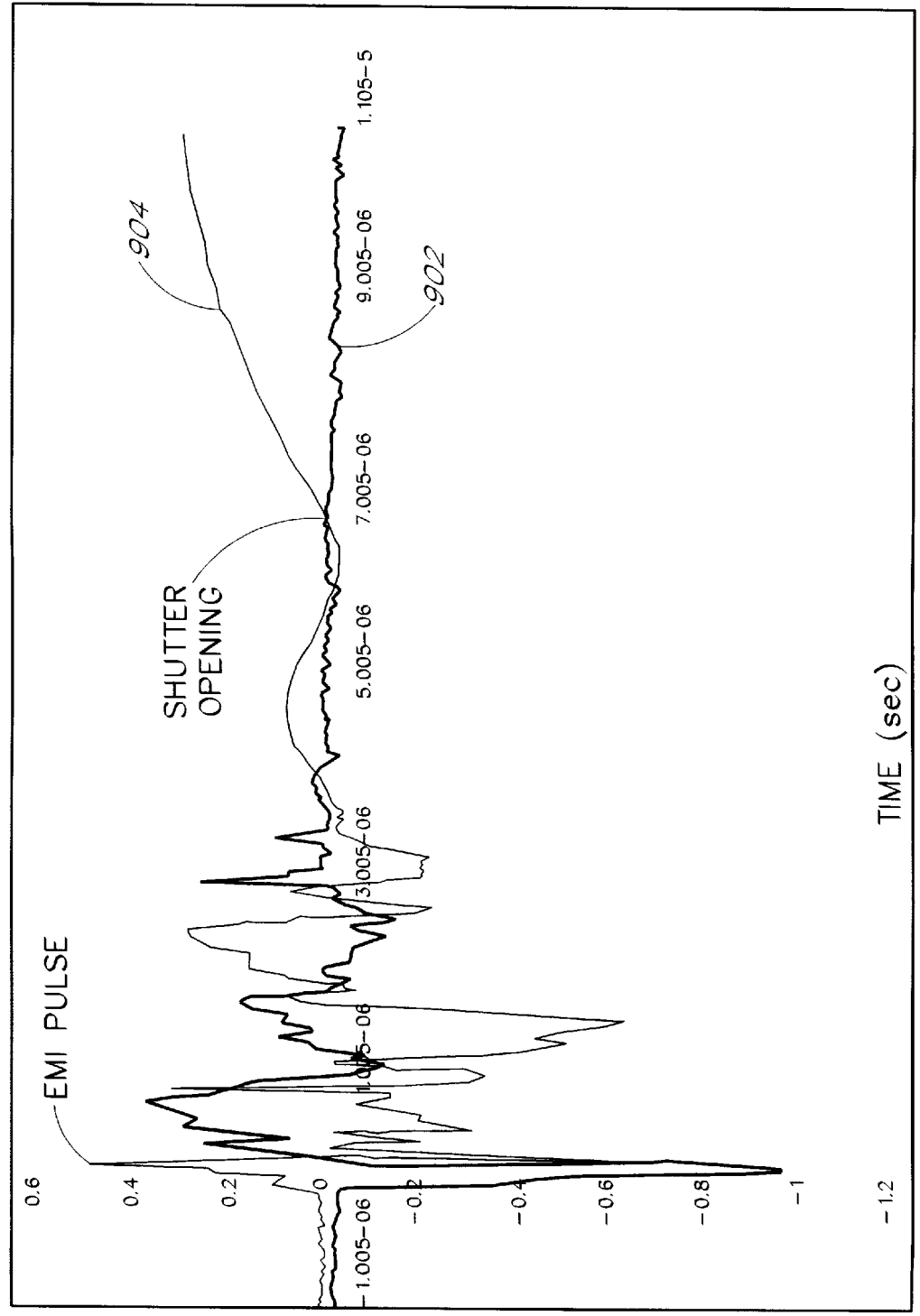
FIG. 9 shows details of the plots from FIG. 8 near the time when the shutter opens.

FIG. 9 is a plot showing curves 902 and 904 similar to those shown in FIG. 8. FIG. 9 shows an expansion of the curves 802, and 804 near the time when the shutter 404 opens. Examination of the curve 902 shows an electromagnetic pulse at a time a few milliseconds before the shutter 404 opens. (The curve 904, corresponding to the optical signal measured through the opened shutter, also shows some electromagnetic interference picked up by the leads attached to the optical sensor.) Data in the curve 902 shows significant electromagnetic emissions before the opening of the shutter 404 that can be sensed by the sensor 204 and used in the E-film cartridge 112 to trigger the image capture process.

Figure 10:
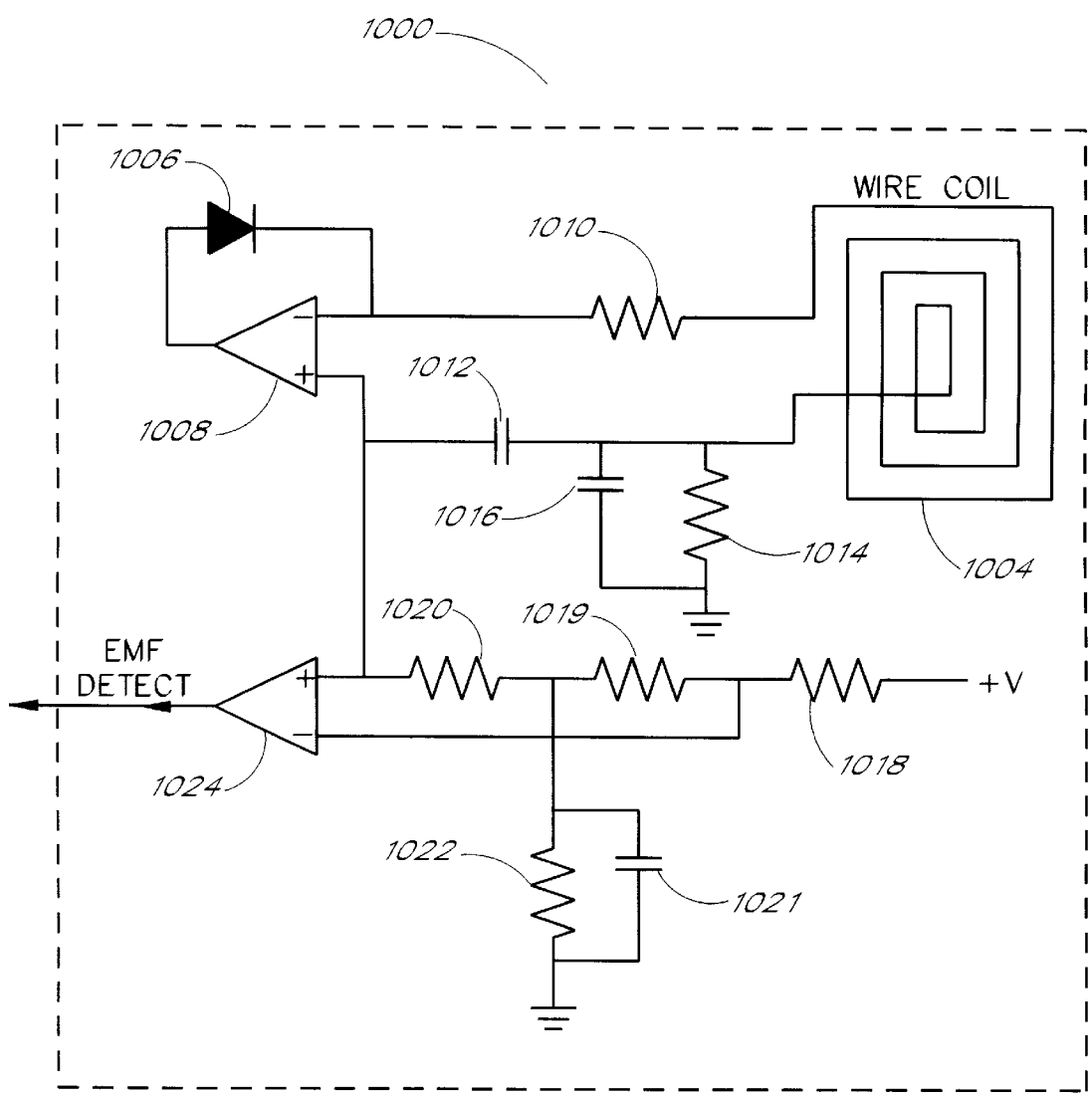
FIG. 10 is a circuit diagram showing one embodiment of an electromagnetic sensor suitable for use in an E-film apparatus.

FIG. 10 shows one embodiment of an electromagnetic sensor that can be used as the sensor 204. The sensor 1000 includes a coil 1004. A first terminal on the coil 1004 is provided to a first terminal of a resistor 1010. A second terminal of the resistor 1010 is provided to an inverting input of an operational amplifier 1008. An output of the operational amplifier 1008 is provided to and an anode of a diode 1006. A cathode of the diode 1006 is provided to the inverting input of the operational amplifier 1008. A second terminal of the coil 1004 is provided to a first terminal of a resistor 1014, to a first terminal of a capacitor 1012, and to a first terminal of a capacitor 1016. The second terminal of the capacitor 1016, and a second terminal of the resistor 1014, are provided to ground. The second terminal of the capacitor 1012 is provided to a non-inverting input of the operational amplifier 10008 and to a non-inverting input of and operational amplifier 1024.

A power supply voltage V+ is provided to a first terminal of a resistor 1018. A second terminal of the resistor 1018 is provided to a first terminal of a resistor 1019 and to an inverting input of the amplifier 1024. A second terminal of the resistor 1019 is provided to a first terminal of a resistor 1020, to a first terminal of a resistor 1022, and to a first terminal of a capacitor 1021. A second terminal of the capacitor 1021, and the second terminal of the resistor 1022, are both provided to ground. The second terminal of the resistor 1020 is provided to a non-inverting input of the amplifier 1024. An output of the amplifier 1024 is provided as an output signal 1030.

The sensor 1000 converts a detected electromagnetic signal into a digital signal that can be used to activate the circuits of E-film cartridge 112 in preparation for capturing an image. The coil 1004 operates as an antenna for electromagnetic signals generated by the camera 110. The first operational amplifier 1008 serves to buffer, detect, and amplify the signal sensed by the coil 1004. The amplifier 1024 is configured as to comparator that compares the detected signal with a threshold signal level. When the detected signal level exceeds the selected threshold signal level the output 1030 is said to a logic 1 (true) otherwise the output 1030 is set to a logic 0 (false).

In one embodiment, the resistor 1010 is 518 ohms, the resistor 1014 is 1 megaohm, the resistor 1018 is 1 megaohm, the resistor 1019 is 2.7k ohms, the resistor 1020 is 100k ohms, and the resistor 1022 is 1megaohm. The capacitor 1012 is 0.22 uf (microfarads), the capacitor 1016 is 1000 pf (picofarads), and the capacitor 1021 is 0.22 uf. The coil 1014 is constructed using 15 turns of wire in a coil approximately 0.7 inches in diameter. The diode 1006 is a small signal diode such as an LL4148, and the opamps 1008 and 1004 are conventional operational amplifiers, such as an OPA2244.

Figure 11:
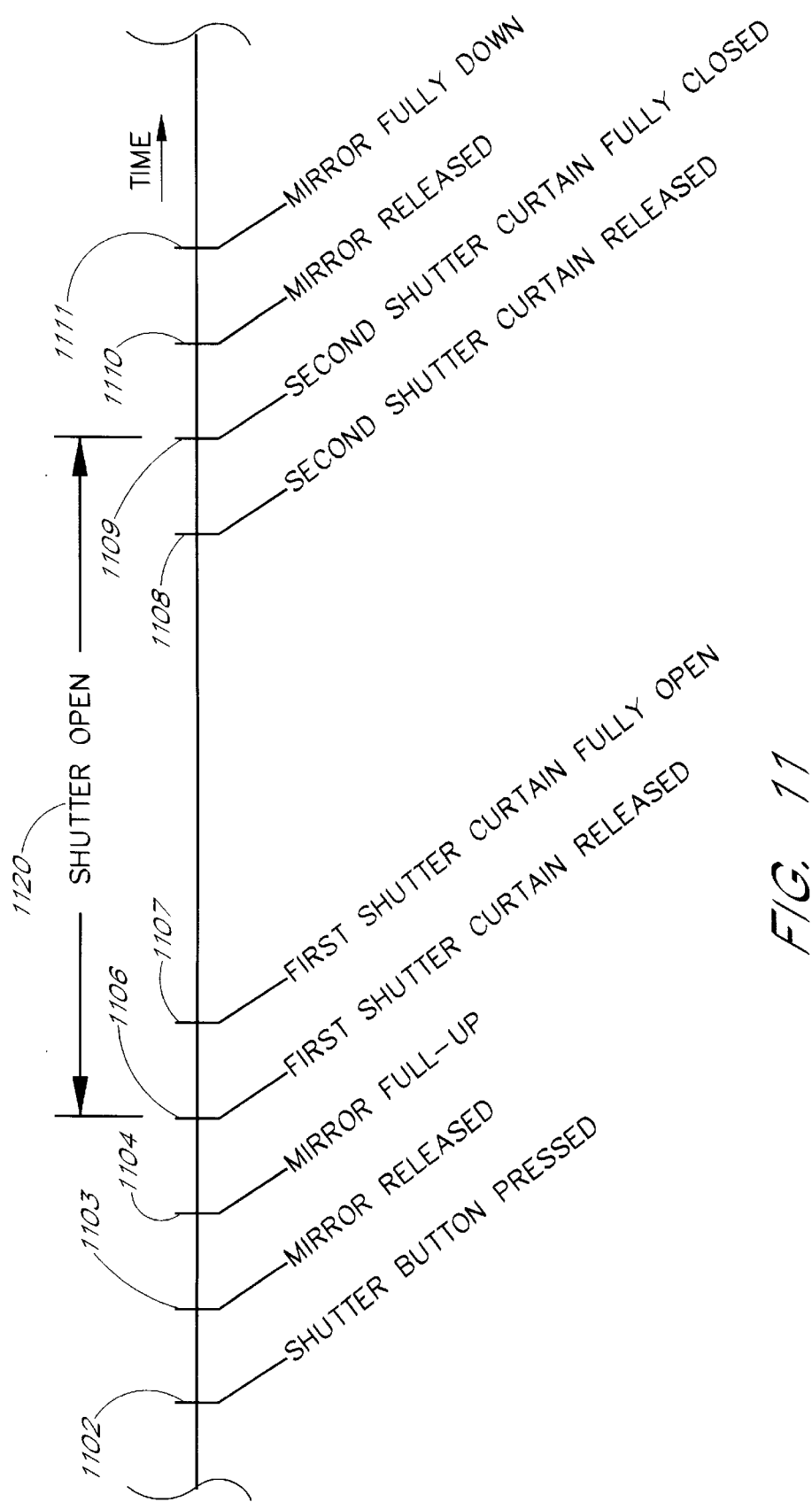
FIG. 11 is a timeline showing operation of a SLR camera during a picture-taking sequence, including operation of the mirror and shutter.

In addition to the electromagnetic techniques discussed above for detecting the camera state 530, acoustic emissions can also be used to detect the camera state 530. Acoustic emissions (i.e. vibrations) are produced by operation of the various mechanical elements of the camera 110. FIG. 11 is a timeline showing the operation of the major mechanical systems of the camera body 110 during a picture-taking operation beginning when the shutter button 118 is pressed. As shown in FIG. 11, pressing the shutter button 118 creates a shutter button event 1102. Shortly after the shutter button event 1102, the mirror 402 is released creating a mirror release event 1103. The mirror travels upwards until it reaches a full up position at a mirror-up event 1104. After the mirror 402 has reached the full up position, a first shutter curtain 1304 (described in connection with FIGS. 13, and 14A–E below), is released at a first curtain release event 1106. The first shutter curtain 1304 travels across the aperture 114 (typically in a horizontal or vertical direction), until the curtain 1304 reaches the fully opened position, corresponding to a first curtain open event 1107. After the shutter has been open for a desired period of time, a second shutter curtain 1306 is released in a second curtain release event 1108. The second shutter curtain 1306 also travels across be aperture 114 until the curtain 1306 reaches a fully closed position at a second curtain closed event 1109.

Once the shutter is fully closed, the mirror is again released at a second mirror release event 1110 and travels downward until it reaches the fully down position at a mirror-down event 1111—whereupon the picture-taking cycle is complete. The shutter is open, or at least partially open, during a time interval 1120 beginning with the first shutter curtain released event 1104 and ending with the second shutter curtain closed event 1109.

Figure 12:
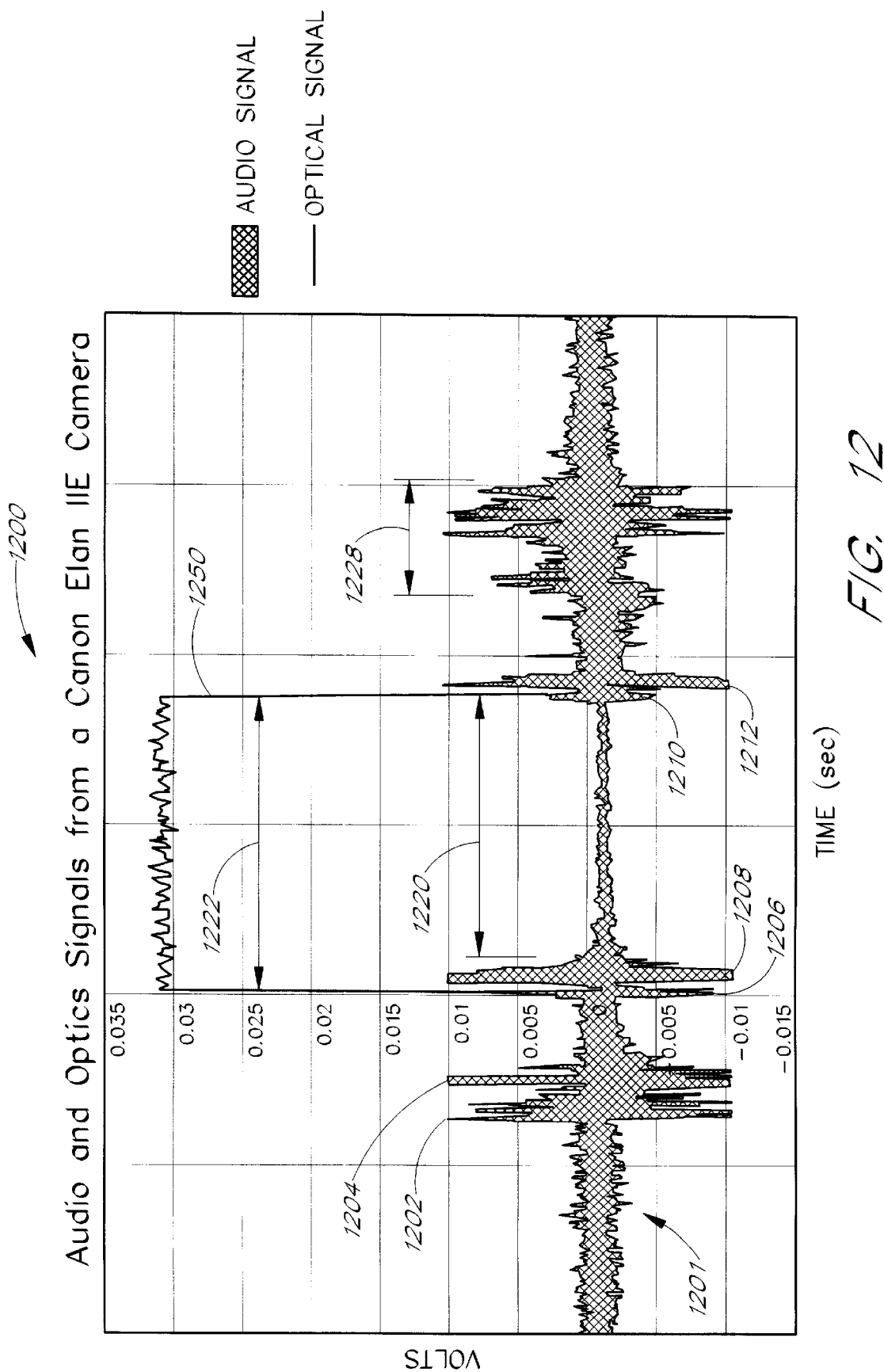
FIG. 12 is plot showing acoustic emissions of a typical SLR camera during the timeline sequence shown in FIG. 11.

FIG. 12 is a plot showing acoustic emissions by the camera 110 during the picture-taking timeline shown in FIG. 11. FIG. 12 includes a curve 1201 that shows acoustic emissions by the camera 110, and a curve 1250 that shows light through the shutter. As shown in the curve 1201, acoustic omissions are initially relatively low, corresponding to a general background noise level. The curve 1201 shows a first acoustic pulse 1202, at a time of approximately t=−0.07 s (seconds), and a second acoustic pulse 1204 at a time of approximately t=−0.05 s. The first acoustic pulse 1202 corresponds approximately to the first mirror release event 1103. The second acoustic pulse 1204 corresponds approximately to the mirror-up event 1104. The pulse 1204 shows a fairly large amplitude corresponding to the impact of the mirror 402 against the camera body when it reaches the full-up position.

The first shutter curtain release event 1106 is identified as a relatively small acoustic pulse 1206 at a time approximately t=0.0 s on the plot 1200. The first shutter curtain fully open event 1107 is identified as a relatively large acoustic pulse 1208 at approximately t=7.0 ms (milliseconds) corresponding to a curtain travel time of approximately 1/125 seconds. The pulse 1208 shows a fairly large amplitude due, in part, to the rapid deceleration of the quickly moving curtain 1304.

The plot 1201 shows a relatively quiet period during an interval 1220 between the first shutter curtain fully open event 1107 and the second shutter curtain release event 1108. The second shutter curtain release event 1108 is identified as a relatively small acoustic pulse 1210 at a time approximately t=0.18 s and the second shutter curtain fully closed event 1109 is identified as a relatively large acoustic pulse 1212 approximately 7.0 milliseconds later.

The time interval corresponding to the time between the second mirror released event 1110 and the mirror fully down event 1111 is identified in the plot 1201 as a time interval 1228 of approximately 0.06 seconds.

Figure 13:
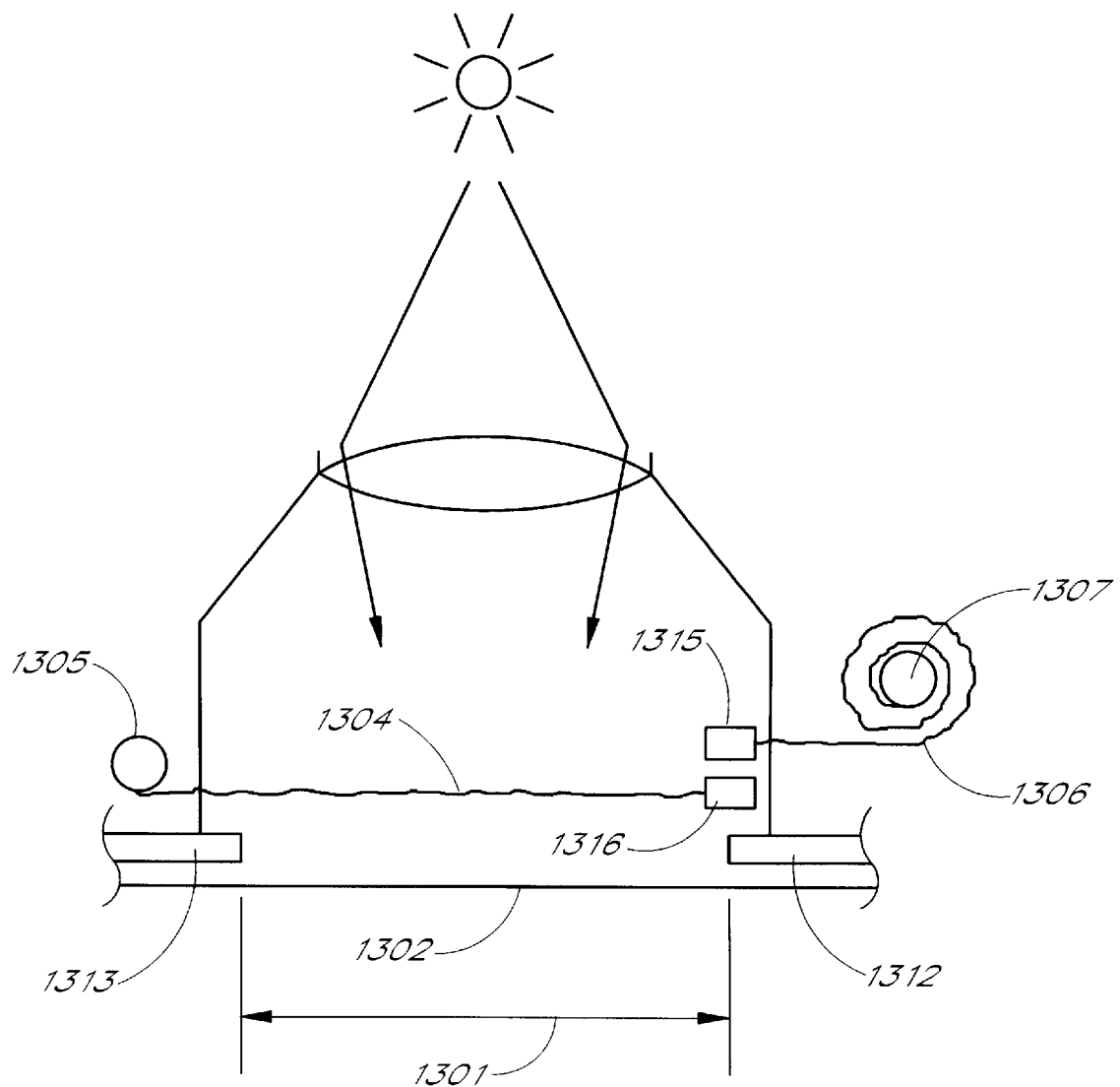
FIG. 13 is a schematic diagram of the mechanical elements of a focal plane shutter as is typically found in a SLR camera.

The acoustic pulses 1206–1212 in FIG. 12, that is, the pulses caused by operation of the shutter, can be understood in light of FIG. 13 and FIGS. 14A–14E which illustrate the operation of a focal plane shutter as is typically used in a SLR camera. In FIG. 13, the focal plane shutter is shown in a closed position corresponding to a time before the picture is taken. FIG. 13 shows the first shutter curtain 1304 and the second shutter curtain 1306. A proximal end of the shutter curtain 1304 is attached to a takeup-spool 1305 and a distal end of the first shutter curtain 1304 is attached to a rib 1316. A proximal end of the second shutter curtain 1306 is attached to a takeup-spool 1307 and the distal end of the second shutter curtain 1306 is attached to a rib 1315. One skilled in the art will recognize that FIG. 13 is illustrative of one embodiment of a focal plane shutter and that other embodiments exist in the art. For example, some focal plane shutters do not use takeup spools, but rather use a plurality of plates that slide past each other. For the present purposes, the embodiment shown in FIG. 13 is sufficient to describe important characteristics of focal plane shutters in general.

FIG. 13 shows the focal plane shutter in the fully "cocked" position ready to begin the picture-taking operation sequence. Thus, in FIG. 13, the first rib 1316 and the second rib of 1315 are positioned near a right edge of an aperture 1301 defined by a right baffle 1312 and a left baffle opening 1313. The first shutter curtain 1304 is shown in a relatively expanded position being unwound from the takeup spool 1305. The second shutter curtain 1306 is shown in a relatively contracted position being wound on the second takeup spool 1307. Photographic film 1302 is disposed behind the aperture 1301 as defined by the baffles 1312 and 1313. The film 1302 is positioned in an image plane of a lens.

FIG. 14 shows the focal plane shutter from FIG. 13 but with the film 1302 removed and replaced by an optical sensor 1402 disposed near the right baffle 1312. The configuration shown in FIG. 14, having the optical sensor 1402, corresponds to the test setup used to measure the acoustic signatures shown in FIG. 12. Operation of the focal plane shutter, as shown in FIGS. 14A–14E, can be used to relate the various operational states of the shutter to the optical and acoustic data shown in FIG. 12. For example, the curve 1250 shown in FIG. 12 corresponds to an output signal from the optical sensor 1402. The curve 1250 is adjusted so that a leading edge is aligned with the time t=0.0.

Figure 14A:
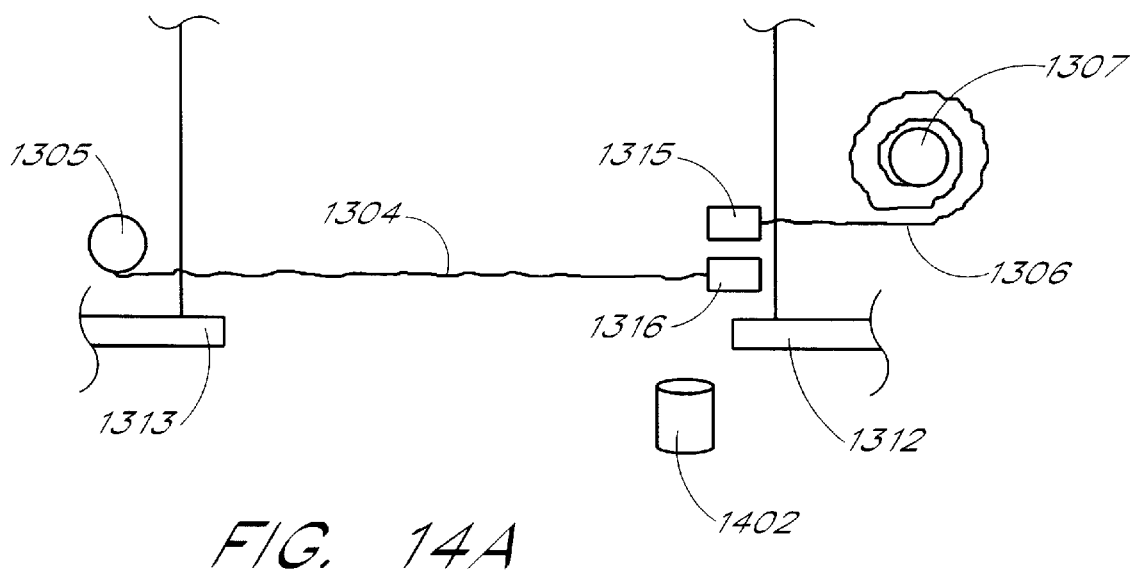
FIG. 14A is a mechanical schematic showing elements of a focal plane shutter as found in a typical single lens reflex camera with an optical sensor for measuring operation of the shutter.
Figure 14B:
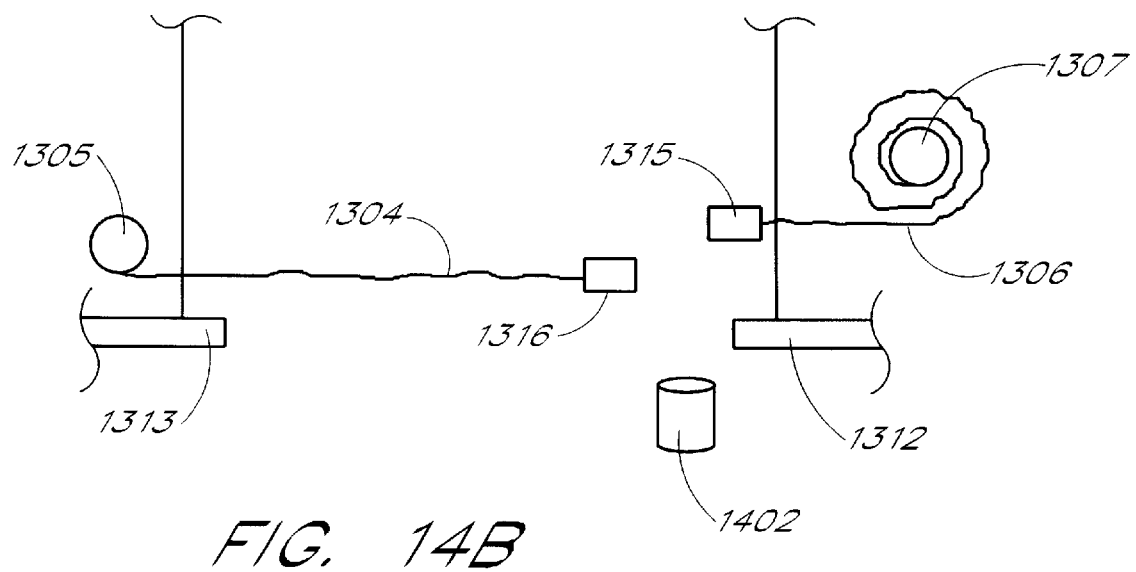
FIG. 14B. shows operation on the shutter of FIG. 14A immediately after release of the first shutter curtain.
Figure 14C:
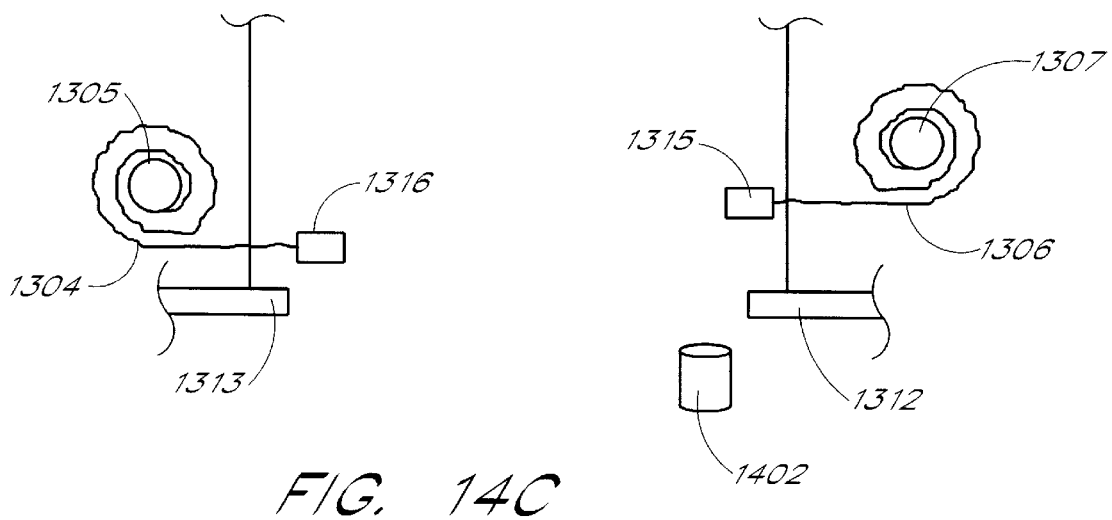
FIG. 14C shows operation of the focal plane shutter shown in FIG. 14A when the first curtain has opened completely.
Figure 14D:
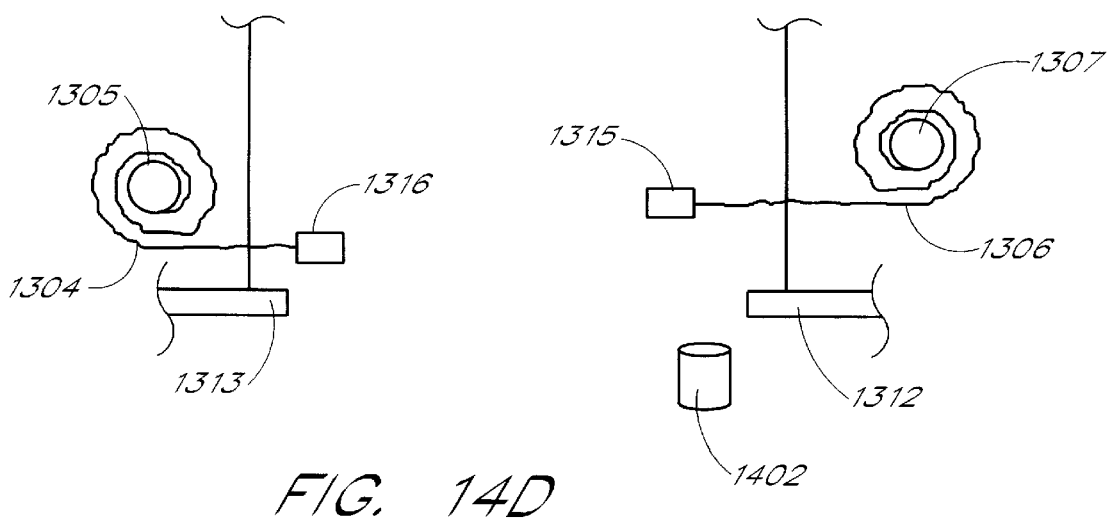
FIG. 14D shows operation of the focal plane shutter off FIG. 14A immediately after release of the second curtain.
Figure 14E:
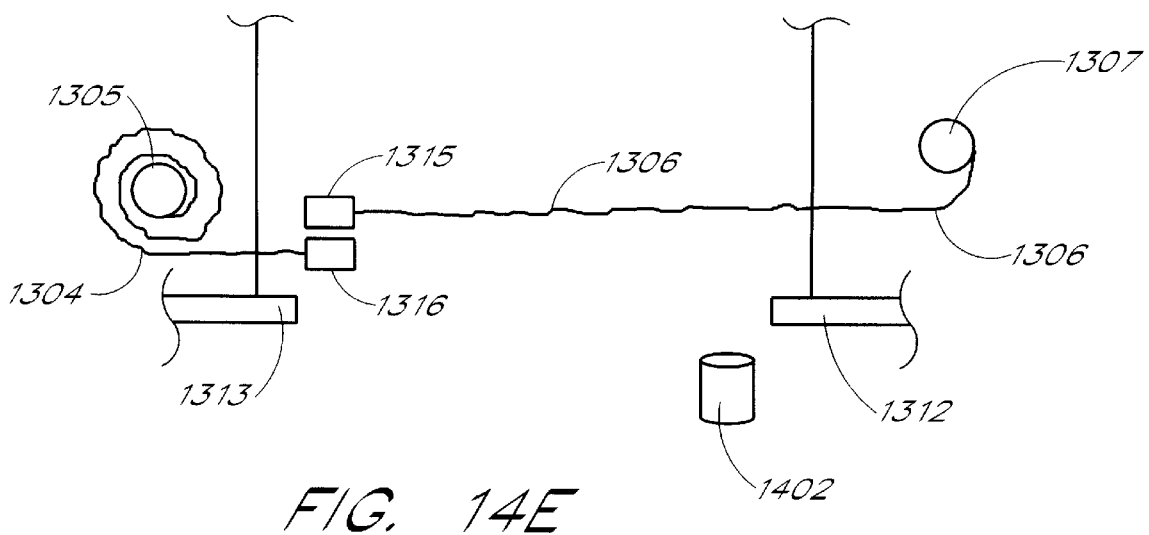
FIG. 14E shows operation of the focal plane shutter shown in FIG. 14A when the second curtain has completely closed.

The small acoustic pulse 1206, corresponding to release of the first curtain 1304, is aligned with the time t=0.0. FIG. 14B shows the shutter at a time when the first shutter curtain 1304 is partially open (shortly after the release event 1106) such that be first rib 1316 has moved slightly left of the baffle 1312, allowing light to travel through the shutter aperture and reach the optical sensor 1402. FIG. 14C shows the focal plane shutter curtain 1304 fully open with the first rib 1316 positioned behind the left baffle 1313 such that the aperture 1301 is completely open.

In the E-film cartridge 112, the optical sensor 210 (shown in FIG. 2) provides functionality similar to that of the optical sensor 1402 (shown in FIG. 14A) and can thus be used to detect the opening (or closing) of the shutter curtains 1304 and 1306. An optional optical source 220 (i.e. an infrared source) can be used to illuminate the shutter curtains and provide an optical signal for the optical sensor 210. When the curtains 1304, 1306 are closed, the optical sensor 210 will detect the illumination reflected by the curtain. When the curtains 1304, 1306 are opened, the illumination will not be reflected by the curtains and the sensor will "know" that the curtains 1304, 1306 are open. In one embodiment, the optical signal provided by the source 220 is a pulsed signal, having a relatively short duration to avoid fogging the image sensed by the image sensor 206.

Unfortunately, the use of the optical sensor 210 to detect the opening of the shutter curtains 1304, 1306 has a drawback in that the optical sensor 210 will have no advance warning that the shutter is about to open. Thus, the optical sensor 210 cannot tell the power supply 620 to power-up the imager 206 and associated circuits in advance. This means that for very fast shutter speeds, the imager 206 may miss a portion of the image.

Fortunately, the first mirror release event 1102 and the mirror up event 1103 occur well before the first curtain release event 1104. Thus, the two acoustic pulses 1202 and 1204, occurring before first shutter curtain release event 1104 are advantageously used by an acoustic sensor system to determine the camera state 530 to predict that the shutter is about to open.

Figure 15:
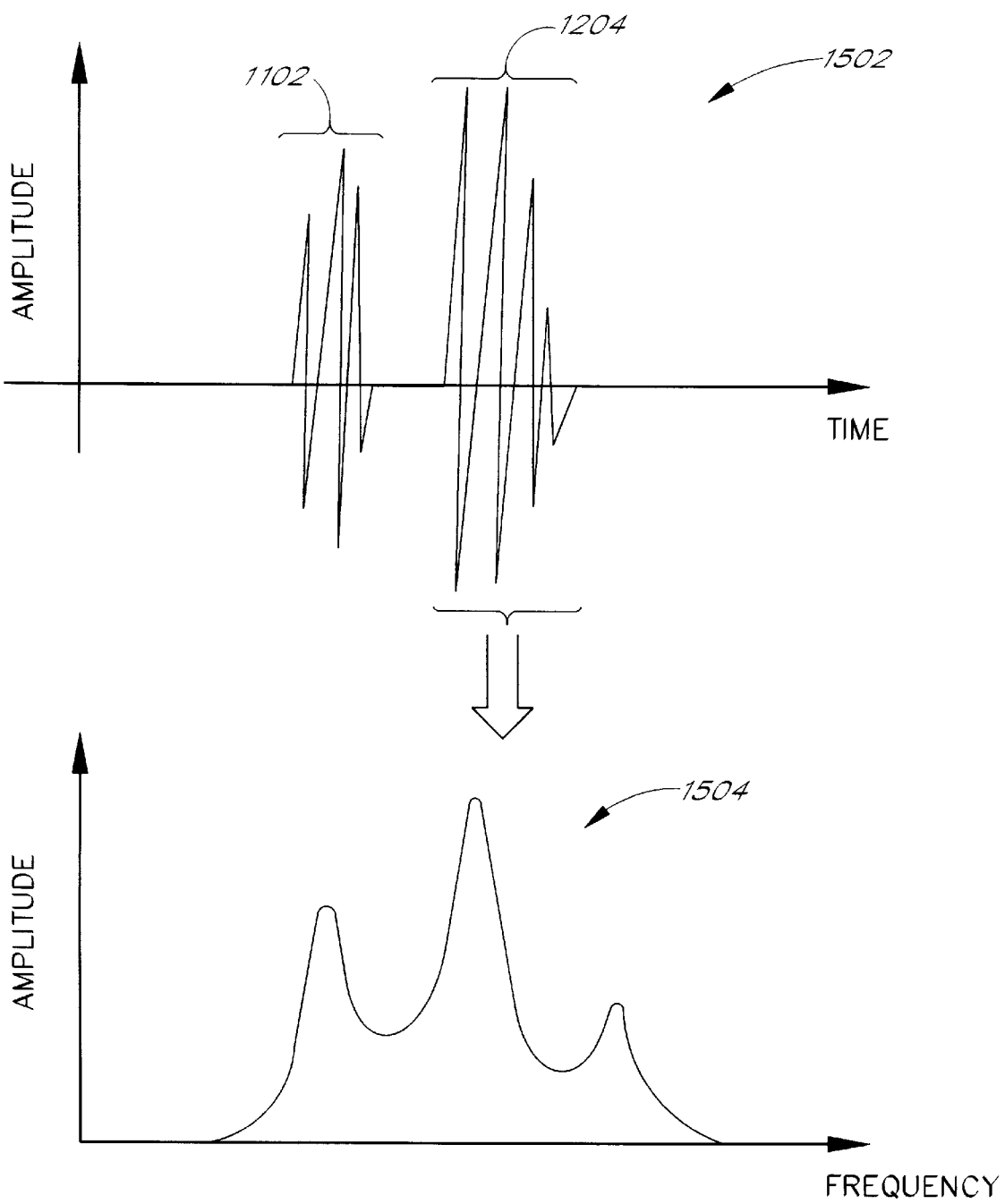
FIG. 15 shows time and frequency domain plots of the optical signature of a SLR camera when the mirror is moving from the down position to the up position prior to release of the first shutter curtain.

FIG. 15 shows a plot 1502 corresponding to the curve that includes the pulses 1202 and 1204. FIG. 15 also shows a frequency domain plot 1504 corresponding to a frequency domain representation (Fourier transform) of the pulse 1204. Each camera produces a frequency domain signature 1504 having an expected frequency domain representation. This frequency domain signature is governed primarily by the construction of the camera 110 and is relatively uniform from camera to camera for a particular camera model. Thus, this frequency domain signature can be used as a "fingerprint" to verify that the acoustic signal being measured is indeed the mirror-up event 1104, which typically proceeds the first shutter curtain release event 1107.

However, sampling the acoustic pulse 1204 and converting the time-domain data into frequency-domain data corresponding to the plot 1504 typically requires more power than the E-film cartridge 112 supplies in its low-power modes. Fortunately, the pulse 1202, which proceeds the pulse 1204 by approximately 10.0 milliseconds, can be used to wake-up the sampling circuits to sample and process the acoustic pulse 1204. Advantageously, the pulse 1202 can be detected by using a relatively low power analog circuit based on a threshold detector. Thus, one embodiment of the analog sensor system 680 is a two-stage sensor having a first stage and a second stage. The first stage uses low-power analog detection. The second stage uses digital signal processing.

Figure 16B:
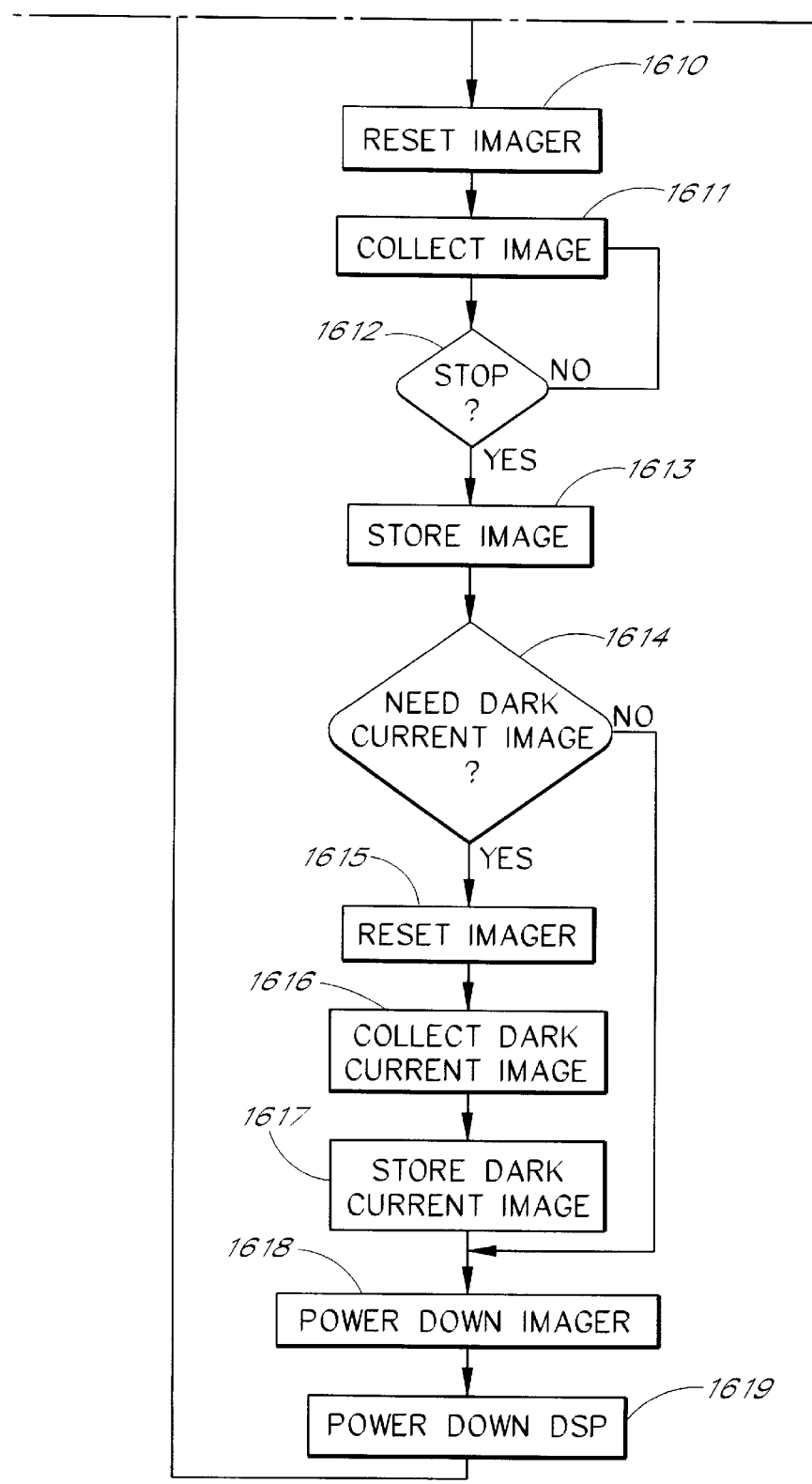
FIG. 16 is a flowchart of the operation of an E-film apparatus using a two-stage acoustic sensor to detect camera state and picture-taking functions.

Operation of the two-stage audio sensor system is shown in a flowchart 1600 in FIG. 16, beginning with at a start block 1601. The flowchart 1600 advances from the start block 1601 to a process block 1602 where a first audio pulse is detected by the first stage (typically an analog sensor). After detecting the analog pulse in the process block 1602, the process advances to a decision block 1603 where the envelope of the audio pulse is compared with a threshold level. If the audio pulse does not exceed the threshold level, then the process returns to the process block 1602. If the envelope of the audio pulse does exceed the threshold level, then the process advances to a process block 1604. In the process block 1604, the E-film cartridge 112 powers up into a low-power digital-audio processing mode. In the digital audio processing mode, power is provided to the processor 630, such as a digital signal processor (DSP). Power is also supplied to sampling and conversion circuits configured to sample the acoustic signal and convert the sampled signal into a digital format for use by the processor 630. The process then advances to a process block 1605 where a sequence of audio samples is collected.

After collecting the audio samples, the process advances to a process block 1606 where the frequency domain spectrum of the audio samples is computed. After computing the frequency domain spectrum, the process advances to a process block 1607 where the computed spectrum is compared with an expected spectrum. The expected spectrum being the frequency domain signature of an event, such as the mirror-up event for a specified make and model of camera 110. The expected spectrum is obtained, for example, by measuring the spectrum produced by a desired make and model of camera. The data for the expected spectrum can be measured from a single occurrence of the desired event, or by averaging together the data produced by several occurrences of the desired event. In one embodiment, the process block 1607 calculates a cross-correlation between the computed spectrum (that is, the spectrum computed from the time-sample data) and the expected spectrum. In one embodiment, the process block 1607 calculates an error (such as, for example, maximum error, a mean squared error, RMS error, and the like). In one embodiment, the process block 1607 is a maximum likelihood estimator. In one embodiment, the process block 1607 uses a neural network to compare the two spectra. In one embodiment, the process block 1607 compares the measured (sampled) time-domain waveform with an expected time-domain waveform.

After the process block 1607, the process then advances to a decision block 1608. In the decision block 1608, if the computed spectrum is not similar to the expected spectrum, then the process returns to the process block 1602. This occurs, for example, when the initial audio pulse was not due to a mirror release event 1103 but rather some other event that produced vibrations or acoustic signals in the camera, such as, for example, closing the camera back, jostling the camera, dropping the camera, changing lenses, etc. If however, in the decision block 1608, it is determined that the computed spectrum is sufficiently similar to the expected spectrum, then the process advances to a process block 1609.

In one embodiment, the decision block 1608 decides based on a probability (e.g., by using a cross-correlation computed in the process block 1607, since cross-correlations are related to probabilities) that the event was a mirror release event. In one embodiment, the decision block 1608 uses a probability factor of approximately 70 percent, that is, the decision block 1608 indicates a match if it decides that there is better than a 70 percent chance that the event was a mirror flip. In another embodiment, the decision block 1608 advances to the process block 1609 if it decides that it is more likely than not (i.e. better than 50 percent chance) that the event was a mirror flip. Other embodiments use percentages in the range of 50 percent to 95 percent.

In the process block 1609 the E-film cartridge 112 is brought up into a full-power or image acquisition mode. In the image acquisition mode, power is applied to the image sensor 206 and associated processing and storage circuits. After powering up the image sensor 206 and associated circuits, the process advances to a process 1610 where the imager is reset. Image acquisition then begins in a subsequent process block 1611. The process then advances to a decision block 1612 that determines when image acquisition is complete. If image acquisition is not complete, the process returns to the process block 1611 to continue collecting the image.

When image acquisition is completed, the process advances to a process block 1613. In the process plot 1613, the image is processed and stored in the internal storage 612. After storing the image, the process advances to a decision block 1614 to determine whether a dark-current image is needed. If no dark-current image is needed, then the process immediately advances to a process block 1618.

If a dark current image is needed the process advances to a process block 1615 where the imager 260 is again reset. After the reset, the process advances to a process block 1616 where a dark current image is collected. After collecting the dark current image, the process advances to a process block 1617 were the dark current image is stored in the memory 612. After the dark current image is stored, the process advances to the process block 1618.

In the process block 1618 the imager 260 and associated circuits are powered down and the process advances to the process block 1619. In the process block 1619, the processor 1630 is powered down and the E-film cartridge 112 reenters the low-power sleep mode. Upon re-entering the low-power sleep mode, the process returns to the process block 1602.

Figure 17:
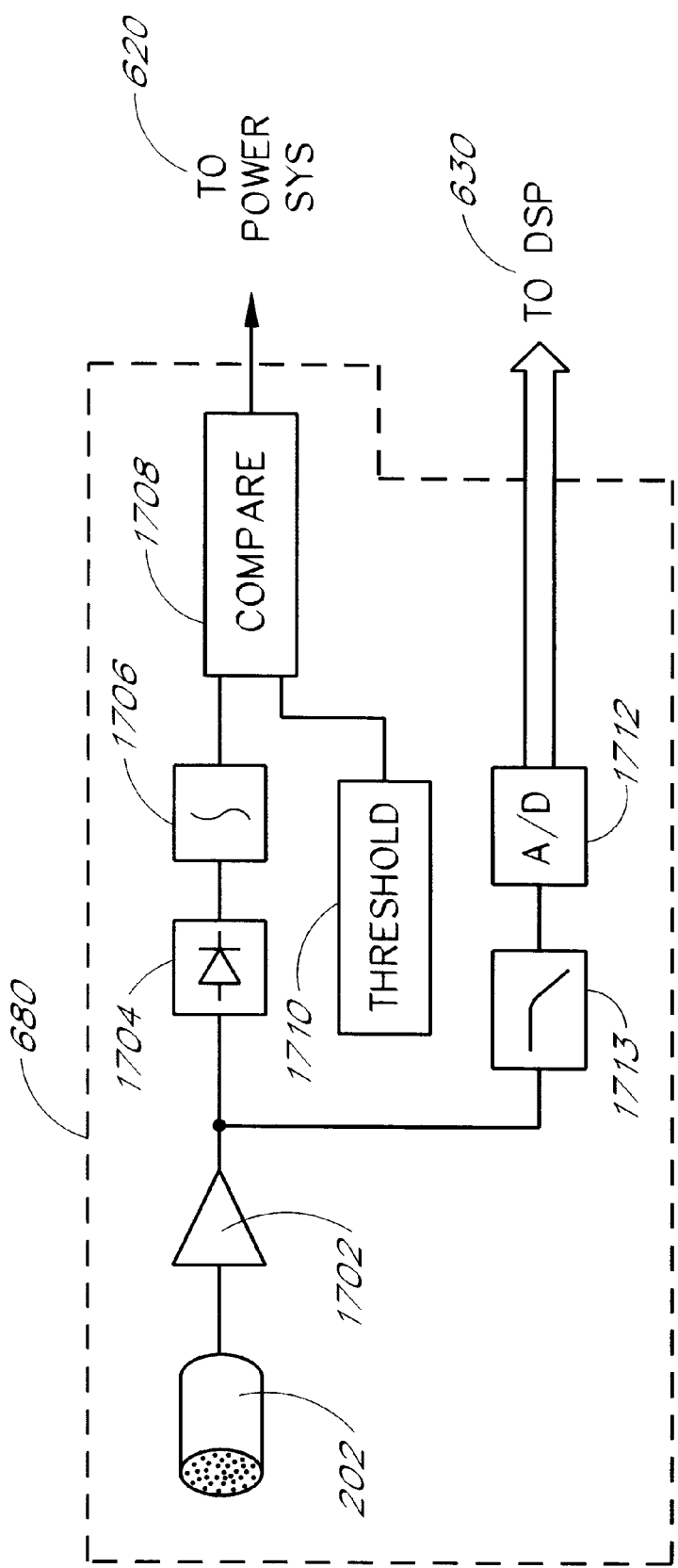
FIG. 17 is the block diagram of a two-stage acoustic sensor system having an analog stage for sensing initial mirror movement and a digital stage for sensing later movement and verifying camera state prior to release of the first shutter curtain.

FIG. 17 is a block diagram of a two-stage acoustic sensor system 680 used in connection with the flow chart 1600 shown in FIG. 16. The acoustic system 680 includes the acoustic sensor 202. Output from the acoustic sensor 202 is provided to an input of an amplifier 1702. Output from the amplifier 1702 is provided to input of a detector 1704 and to an input of a filter 1713.

An output from the detector 1704 is provided to input of an integrator 1706. An output from the integrator 1706 is provided to a first input of a comparator 1708. An output from a threshold block 1710 is provided to a second input of the comparator 1708. An output from the comparator 1708 is provided to the power system 620. An output from the filter 1713 is provided to an analog input of an analog-to-digital converter 1712. A digital output from the analog-to-digital converter 1712 is provided to the processor 630.

The acoustic sensor 202 detects an acoustic emission from the camera 110 and converts the emission into an electrical signal that is amplified by the amplifier 1702. The envelope of the amplified signal is calculated by the detector 1704 acting in concert with the integrator 1706. The output from integrator 1706 is the envelope signal.

Thus the operation of the detector 1704 and integrator 1706 correspond approximately to the process block 1602 shown FIG. 16, and the operation of the comparator 1708 corresponds approximately to the decision block 1603 also shown FIG. 16. The output from the comparator 1708 is provided to the power system 620. In response to an output from the comparator, the power system 620 will power-up the processor 630, analog-to-digital converter 1712, and other associated circuits used to sample and process the audio signal.

The lowpass filter 1713 is an anti-alias and filter for the analog-to-digital converter 1712. The output of the analog-to-digital converter 1712 is provided to the processor 630 allowing the processor 630 to compute the spectrum of the audio signal sensed by the sensor 202.

The embodiments described above are provided merely to illustrate the present invention. Changes and modifications may be made from the embodiments presented herein by those skilled in the art without departure from the spirit and scope of the invention, as defined by the appended claims.

What is claimed is:

1. An electronic film apparatus that reversibly converts a conventional film camera body into an electronic film camera, comprising:
   an electronic image sensor that converts an optical image into an electrical signal;
   a sensor that senses emissions in said camera body, said sensor producing a sensor signal, said sensor comprising an electromagnetic sensor; and
   a signal processor configured to determine an operating state of said camera body from said sensor signal.

2. The electronic film apparatus of claim 1 further comprising a power system configured to operate said electronic film apparatus in at least one of a very low power mode, a low power mode, and a full power mode.

3. The electronic film apparatus of claim 1 wherein said operating state is a picture-taking state.

4. The electronic film apparatus of claim 1 wherein said operating state is a shutter-open state.

5. The electronic film apparatus of claim 1 wherein said operating state is a mirror-up state.

6. The electronic film apparatus of claim 1 wherein said operating state is a mirror-down state.

7. The electronic film apparatus of claim 1 wherein said apparatus is an electronic film cartridge configured to reversibly convert a conventional 35 mm film camera into an electronic film camera.

8. The electronic film apparatus of claim 1 wherein said apparatus is an electronic film back.

9. The electronic film apparatus of claim 1, further comprising an optical sensor configured to sense optical energy reflected by a shutter in said camera body.

10. The electronic film apparatus of claim 9, further comprising an optical source configured to produce said optical energy reflected by said shutter.

11. An electronic film apparatus that reversibly converts a conventional film camera body into an electronic film camera, comprising:
   an electronic image sensor that converts an optical image into an electrical signal;
   a sensor that senses emissions in said camera body, said sensor producing a sensor signal, said sensor comprising an acoustic sensor; and
   a signal processor configured to determine an operating state of said camera body from said sensor signal.

12. The electronic film apparatus of claim 11 further comprising a power system configured to operate said electronic film apparatus in at least one of a very low power mode, a low power mode, and a full power mode.

13. The electronic film apparatus of claim 11 wherein said operating state is a picture-taking state.

14. The electronic film apparatus of claim 11 wherein said operating state is a shutter-open state.

15. The electronic film apparatus of claim 11 wherein said operating state is a mirror-up state.

16. The electronic film apparatus of claim 11 wherein said operating state is a mirror-down state.

17. The electronic film apparatus of claim 11 wherein said apparatus is an electronic film cartridge configured to reversibly convert a conventional 35 mm film camera into an electronic film camera.

18. The electronic film apparatus of claim 11 wherein said apparatus is an electronic film back.

19. The electronic film apparatus of claim 11, further comprising an optical sensor configured to sense optical energy reflected by a shutter in said camera body.

20. The electronic film apparatus of claim 19, further comprising an optical source configured to produce said optical energy reflected by said shutter.

21. An electronic film apparatus that reversibly converts a conventional film camera body into an electronic film camera, comprising:
   an electronic image sensor that converts an optical image into an electrical signal;
   a sensor that senses emissions in said camera body, said sensor producing a sensor signal;
   a signal processor configured to determine an operating state of said camera body from said sensor signal; and
   an optical source, wherein said sensor comprises an optical sensor configured to sense an optical signal produced by said optical source.

22. The electronic film apparatus of claim 21 further comprising a power system configured to operate said electronic film apparatus in at least one of a very low power mode, a low power mode, and a full power mode.

23. The electronic film apparatus of claim 21 wherein said operating state is a picture-taking state.

24. The electronic film apparatus of claim 21 wherein said operating state is a shutter-open state.

25. The electronic film apparatus of claim 21 wherein said operating state is a mirror-up state.

26. The electronic film apparatus of claim 21 wherein said operating state is a mirror-down state.

27. The electronic film apparatus of claim 21 wherein said apparatus is an electronic film cartridge configured to reversibly convert a conventional 35 mm film camera into an electronic film camera.

28. The electronic film apparatus of claim 21 wherein said apparatus is an electronic film back.

29. An electronic film apparatus that reversibly converts a conventional film camera body into an electronic film camera, comprising:
   an electronic image sensor that converts an optical image into an electrical signal;
   a sensor that senses emissions in said camera body, said sensor producing a sensor signal, the sensor comprising a coil having one or more turns, said coil configured to convert electromagnetic fields produced by said camera body into an electric signal having a signal envelope; and
   a signal processor configured to determine an operating state of said camera body from said sensor signal.

30. The electronic film apparatus of claim 29 further comprising a detector configured to detect said signal envelope to produce an envelope signal.

31. The electronic film apparatus of claim 30 further comprising a comparator configured to compare said envelope signal to a threshold value.

32. An electronic film apparatus that reversibly converts a conventional film camera body into an electronic film camera, comprising:
   an electronic image sensor that converts an optical image into an electrical signal;
   a sensor that senses emissions in said camera body, said sensor producing a sensor signal, the sensor comprising an acoustic sensor configured to sense vibration produced in the camera body due to operation of the mechanical aspects of the camera body and to produce an electrical signal in response to said vibrations; and a signal processor configured to determine an operating state of said camera body from said sensor signal.

33. The electronic film apparatus of claim 32 further comprising a first signal processor configured to compare an envelope of said electrical signal with a threshold value, said first signal processor producing a first state signal value of true when said threshold is exceeded.

34. The electronic film apparatus of claim 33 further comprising a second signal processor configured to acquire digital samples from said acoustic sensor in response to said first state signal having a value of true, said second signal processor further comprising a Fourier transform module configured to compute a frequency spectrum of said digital samples to produce a computed spectrum, said second signal processor further configured to compare said computed spectrum to an expected spectrum and initiate image acquisition when said computed spectrum is similar to said expected spectrum.

35. An electronic film apparatus that reversibly converts a conventional film camera body into an electronic film camera, comprising:
   an electronic image sensor that converts an optical image into an electrical signal;
   a sensor that senses emissions in said camera body, said sensor producing a sensor signal;
   a signal processor configured to determine an operating state of said camera body from said sensor signal;
   an optical sensor configured to sense optical energy reflected by a shutter in said camera body; and
   an optical source configured to produce said optical energy reflected by said shutter.

36. An apparatus for sensing an operational event in a camera body, comprising:
   a sensor that senses emissions from said camera body, said sensor producing a sensor signal, the sensor comprising an electromagnetic sensor; and
   a signal processor configured to determine an operating state of said camera body from said sensor signal.

37. The apparatus of claim 36 further comprising an optical source, wherein said sensor comprises an optical sensor configured to sense an optical signal produced by said optical source.

38. The apparatus of claim 36 further comprising a power system configured to operate said electronic film apparatus in at least one of a very low power mode, a low power mode, and a full power mode.

39. The apparatus of claim 36 wherein said event is a picture-taking event.

40. The apparatus of claim 36 wherein said event is a shutter-open event.

41. The apparatus of claim 36 wherein said event is a mirror-up event.

42. The apparatus of claim 36 wherein said event is a mirror-down event.

43. The apparatus of claim 36 wherein said apparatus is an electronic film cartridge configured to reversibly convert a conventional 35 mm film camera into an electronic film camera.

44. The apparatus of claim 36 wherein said apparatus is an electronic film back.

45. The apparatus of claim 36 wherein said sensor comprises a coil having one or more turns, said coil configured to convert electromagnetic fields produced by said camera body into an electric signal having a signal envelope.

46. The apparatus of claim 45 further comprising a detector configured to detect said signal envelope to produce an envelope signal.

47. The apparatus of claim 46 further comprising a comparator configured to compare said envelope signal to a threshold value.

48. The apparatus of claim 36, wherein said signal processor is configured to compare a computed spectrum with an expected spectrum.

49. The apparatus of claim 36, wherein said signal processor is configured to compare a measured time-domain waveform with an expected time-domain waveform.

50. The apparatus of claim 36, wherein said signal processor is configured to compare a measured waveform with an expected waveform.

51. The apparatus of claim 36, further comprising a neural network configured to compare a computed waveform with an expected waveform.

52. An apparatus for sensing an operational event in a camera body, comprising:
   a sensor that senses emissions from said camera body, said sensor producing a sensor signal, the sensor comprising an acoustic sensor; and
   a signal, processor configured to determine an operating state of said camera body from said sensor signal.

53. The apparatus of claim 52 further comprising a power system configured to operate said electronic film apparatus in at least one of a very low power mode, a low power mode, and a full power mode.

54. The apparatus of claim 52 wherein said event is a picture-taking event.

55. The apparatus of claim 52 wherein said event is a shutter-open event.

56. The apparatus of claim 52 wherein said event is a mirror-up event.

57. The apparatus of claim 52 wherein said event is a mirror-down event.

58. The apparatus of claim 52 wherein said apparatus is an electronic film cartridge configured to reversibly convert a conventional 35 mm film camera into an electronic film camera.

59. The apparatus of claim 52 wherein said apparatus is an electronic film back.

60. The apparatus of claim 52, wherein said signal processor is configured to compare a computed spectrum with an expected spectrum.

61. The apparatus of claim 52, wherein said signal processor is configured to compare a measured time-domain waveform with an expected time-domain waveform.

62. The apparatus of claim 52, wherein said signal processor is configured to compare a measured waveform with an expected waveform.

63. The apparatus of claim 52, further comprising a neural network configured to compare a computed waveform with an expected waveform.

64. An apparatus for sensing an operational event in a camera body, comprising:
   a sensor that senses emissions from said camera body, said sensor producing a sensor signal;
   a signal processor configured to determine an operating state of said camera body from said sensor signal; and
   an optical source, wherein said sensor comprises an optical sensor configured to sense an optical signal produced by said optical source.

65. The apparatus of claim 64 further comprising a power system configured to operate said electronic film apparatus in at least one of a very low power mode, a low power mode, and a full power mode.

66. The apparatus of claim 64 wherein said event is a picture-taking event.

67. The apparatus of claim 64 wherein said event is a shutter-open event.

68. The apparatus of claim 64 wherein said event is a mirror-up event.

69. The apparatus of claim 64 wherein said event is a mirror-down event.

70. The apparatus of claim 64 wherein said apparatus is an electronic film cartridge configured to reversibly convert a conventional 35 mm film camera into an electronic film camera.

71. The apparatus of claim 64 wherein said apparatus is an electronic film back.

72. The apparatus of claim 64, wherein said signal processor is configured to compare a computed spectrum with an expected spectrum.

73. The apparatus of claim 64, wherein said signal processor is configured to compare a measured time-domain waveform with an expected time-domain waveform.

74. The apparatus of claim 64, wherein said signal processor is configured to compare a measured waveform with an expected waveform.

75. The apparatus of claim 64, further comprising a neural network configured to compare a computed waveform with an expected waveform.

76. An apparatus for sensing an operational event in a camera body, comprising:
   a sensor that senses emissions from said camera body, said sensor producing a sensor signal, said sensor comprising a coil having one or more turns, said coil configured to convert electromagnetic fields produced by said camera body into an electric signal having a signal envelope; and
   a signal processor configured to determine an operating state of said camera body from said sensor signal.

77. The apparatus of claim 76 further comprising a power system configured to operate said electronic film apparatus in at least one of a very low power mode, a low power mode, and a full power mode.

78. The apparatus of claim 76 wherein said event is a picture-taking event.

79. The apparatus of claim 76 wherein said event is a shutter-open event.

80. The apparatus of claim 76 wherein said event is a mirror-up event.

81. The apparatus of claim 76 wherein said event is a mirror-down event.

82. The apparatus of claim 76 wherein said apparatus is an electronic film cartridge configured to reversibly convert a conventional 35 mm film camera into an electronic film camera.

83. The apparatus of claim 76 wherein said apparatus is an electronic film back.

84. The apparatus of claim 76 further comprising a detector configured to detect said signal envelope to produce an envelope signal.

85. The apparatus of claim 84 further comprising a comparator configured to compare said envelope signal to a threshold value.

86. The apparatus of claim 76, wherein said signal processor is configured to compare a computed spectrum with an expected spectrum.

87. The apparatus of claim 76, wherein said signal processor is configured to compare a measured time-domain waveform with an expected time-domain waveform.

88. The apparatus of claim 76, wherein said signal processor is configured to compare a measured waveform with an expected waveform.

89. The apparatus of claim 76, further comprising a neural network configured to compare a computed waveform with an expected waveform.

90. An apparatus for sensing an operational event in a camera body, comprising:
   a sensor that senses emissions from said camera body, said sensor producing a sensor signal, said sensor comprising an acoustic sensor configured to sense vibration produced in the camera body due to operation of the mechanical aspects of the camera body and to produce an electrical signal in response to said vibrations; and
   a signal processor configured to determine an operating state of said camera body from said sensor signal.

91. The apparatus of claim 90 further comprising a power system configured to operate said electronic film apparatus in at least one of a very low power mode, a low power mode, and a full power mode.

92. The apparatus of claim 90 wherein said event is a picture-taking event.

93. The apparatus of claim 90 wherein said event is a shutter-open event.

94. The apparatus of claim 90 wherein said event is a mirror-up event.

95. The apparatus of claim 90 wherein said event is a mirror-down event.

96. The apparatus of claim 90 wherein said apparatus is an electronic film cartridge configured to reversibly convert a conventional 35mm film camera into an electronic film camera.

97. The apparatus of claim 90 wherein said apparatus is an electronic film back.

98. The apparatus of claim 90, wherein said signal processor is configured to compare a measured time-domain waveform with an expected time-domain waveform.

99. The apparatus of claim 90, wherein said signal processor is configured to compare a measured waveform with an expected waveform.

100. The apparatus of claim 90, further comprising a neural network configured to compare a computed waveform with an expected waveform.

101. A method for sensing an operational event in a camera body, comprising the acts of:
   sensing emissions in said camera body, wherein said emissions comprise electromagnetic emissions; and
   computing a probable camera event from information in said emissions.

102. The method of claim 101 wherein said emissions comprise optical emissions.

103. The method of claim 101 further comprising the act of sensing optical emissions from an optical source in said camera body.

104. The method of claim 101 further comprising the act of selecting a power operating level.

105. The method of claim 101 wherein said event is a shutter-close event.

106. The method of claim 101 wherein said event is a shutter-open event.

107. The method of claim 101 wherein said event is a mirror-up event.

108. The method of claim 101 wherein said event is a mirror-down event.

109. The method of claim 101 further comprising the act of detecting a signal envelope to produce an envelope signal.

110. The method of claim 109 further comprising the act of comparing an amplitude of said envelope signal with a threshold value.

111. The method of claim 101, wherein the act of computing comprises comparing a computed spectrum with an expected spectrum.

112. The method of claim 101, wherein the act of computing comprises comparing a measured time-domain waveform with an expected time-domain waveform.

113. The method of claim 101, wherein the act of computing comprises comparing a measured waveform with an expected waveform.

114. The method of claim 101, wherein the act of computing comprises calculating a cross-correlation between a first waveform and a second waveform.

115. A method for sensing an operational event in a camera body, comprising the acts of:

sensing emissions in said camera body, wherein said emissions comprise acoustic emissions; and computing a probable camera event from information in said emissions.

116. The method of claim 115 further comprising the act of selecting a power operating level.

117. The method of claim 115 wherein said event is a shutter-close event.

118. The method of claim 115 wherein said event is a shutter-open event.

119. The method of claim 115 wherein said event is a mirror-up event.

120. The method of claim 115 wherein said event is a mirror-down event.

121. The method of claim 115 further comprising the act of detecting a signal envelope to produce an envelope signal.

122. The method of claim 121 further comprising the act of comparing an amplitude of said envelope signal with a threshold value.

123. The method of claim 115, wherein the act of computing comprises comparing a computed spectrum with an expected spectrum.

124. The method of claim 115, wherein the act of computing comprises comparing a measured time-domain waveform with an expected time-domain waveform.

125. The method of claim 115, wherein the act of computing comprises comparing a measured waveform with an expected waveform.

126. The method of claim 115, wherein the act of computing comprises calculating a cross-correlation between a first waveform and a second waveform.

127. A method for sensing an operational event in a camera body, comprising the acts of:

sensing emissions in said camera body;

computing a probable camera event from information in said emissions; and sensing optical emissions from an optical source in said camera body.

128. The method of claim 127 further comprising the act of selecting a power operating level.

129. The method of claim 127 wherein said event is a shutter-close event.

130. The method of claim 127 wherein said event is a shutter-open event.

131. The method of claim 127 wherein said event is a mirror-up event.

132. The method of claim 127 wherein said event is a mirror-down event.

133. The method of claim 127 further comprising the act of detecting a signal envelope to produce an envelope signal.

134. The method of claim 133 further comprising the act of comparing an amplitude of said envelope signal with a threshold value.

135. The method of claim 127, wherein the act of computing comprises comparing a computed spectrum with an expected spectrum.

136. The method of claim 127, wherein the act of computing comprises comparing a measured time-domain waveform with an expected time-domain waveform.

137. The method of claim 127, wherein the act of computing comprises comparing a measured waveform with an expected waveform.

138. The method of claim 127, wherein the act of computing comprises calculating a cross-correlation between a first waveform and a second waveform.

139. A method for sensing an operational event in a camera body, comprising the acts of:

sensing emissions in said camera body;

computing a probable camera event from information in said emissions; and detecting a signal envelope to produce an envelope signal.

140. The method of claim 139 wherein said emissions comprise electromagnetic emissions.

141. The method of claim 139 wherein said emissions comprise acoustic emissions.

142. The method of claim 139 wherein said emissions comprise optical emissions.

143. The method of claim 139 further comprising the act of selecting a power operating level.

144. The method of claim 139 wherein said event is a shutter-close event.

145. The method of claim 139 wherein said event is a shutter-open event.

146. The method of claim 139 wherein said event is a mirror-up event.

147. The method of claim 139 wherein said event is a mirror-down event.

148. The method of claim 139 further comprising the act of comparing an amplitude of said envelope signal with a threshold value.

149. The method of claim 139, wherein the act of computing comprises comparing a computed spectrum with an expected spectrum.

150. The method of claim 139, wherein the act of computing comprises comparing a measured time-domain waveform with an expected time-domain waveform.

151. The method of claim 139, wherein the act of computing comprises comparing a measured waveform with an expected waveform.

152. The method of claim 139, wherein the act of computing comprises calculating a cross-correlation between a first waveform and a second waveform.

* * * * *